(12) United States Patent
Vaidya et al.

(10) Patent No.: US 11,882,493 B2
(45) Date of Patent: Jan. 23, 2024

(54) WIRELESS NETWORK SWITCHOVER VIA TUNE-AWAY NOTIFICATIONS

(71) Applicant: Charter Communications Operating, LLC, St. Louis, MO (US)

(72) Inventors: Maulik V. Vaidya, Escondido, CA (US); Amitav Mukherjee, Elk Grove, CA (US); Ahmad Reza Hedayat, Carlsbad, CA (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 17/895,470

(22) Filed: Aug. 25, 2022

(65) Prior Publication Data

US 2022/0408330 A1 Dec. 22, 2022

Related U.S. Application Data

(63) Continuation of application No. 16/789,280, filed on Feb. 12, 2020, now Pat. No. 11,470,524.

(51) Int. Cl.
*H04W 4/00* (2018.01)
*H04W 36/08* (2009.01)
(Continued)

(52) U.S. Cl.
CPC ........... *H04W 36/08* (2013.01); *H04W 24/08* (2013.01); *H04W 36/0058* (2018.08); *H04W 68/005* (2013.01)

(58) Field of Classification Search
CPC . H04W 36/08; H04W 36/0058; H04W 24/08; H04W 68/005
See application file for complete search history.

(56) References Cited

U.S. PATENT DOCUMENTS 11,470,524 B2 * 10/2022 Vaidya ................. H04W 36/08
2012/0190362 A1 * 7/2012 Subbarayudu ........ H04W 76/28
455/435.1
(Continued)

OTHER PUBLICATIONS

3GPP TSG RAN Meeting #86, RP-193263, Support for Multi-SIM devices in Rel-17, Stiges, Spain, Dec. 9-12, 2019, pp. 5, Source: vivo, China Telecom, China Unicom, Title: New WID: Support for Multi-SIM devices in Rel-17, Document for: Approval Agenda Item: 9.1.2.
(Continued)

*Primary Examiner* — Justin Y Lee
(74) *Attorney, Agent, or Firm* — Armis IP Law, LLC

(57) ABSTRACT

According to one configuration, while the user equipment is wirelessly connected to a first wireless base station over a first wireless communication link, a communication management resource in the user equipment receives input (such as a request) to tune-away the user equipment to a second wireless base station providing corresponding wireless services. To facilitate the temporary tune-away to the second wireless network, the communication management resource of the user equipment generates timing information associated with the switchover. In furtherance of the switchover (temporary tune-away) to the second wireless base station, the communication management resource of the user equipment transmits the timing information in a wireless communication over the first wireless communication link to the first wireless base station.

33 Claims, 13 Drawing Sheets

(51) Int. Cl.
  *H04W 36/00* (2009.01)
  *H04W 24/08* (2009.01)
  *H04W 68/00* (2009.01)

(56) References Cited

U.S. PATENT DOCUMENTS

2018/0184309 A1* 6/2018 Bhardwaj ............ H04W 72/542
2021/0105866 A1* 4/2021 Kavuri ................. H04W 76/25

OTHER PUBLICATIONS

3GPP TS 38.300 v15.8.0: "3rd Generation Partnership Project; Technical Specification Group Radio Access Network; NR; NR and NG-RAN Overall Description; Stage 2NR (Release 15)" Dec. 2019, pp. 99, @ 2019, 3GPP Organizational Partners (ARIB, ATIS, CCSA, ETSI, TSDSI, TTA, TTC).

3GPP TS 38.331 version 15.3.0 Release 15: "NR; Radio Resource Control (RRC); Protocol specification" ETSI TS 138 331 v15.3.0, Oct. 2018, pp. 441.

3GPP TSG-SA Meeting #84, SP-190309, "WID on Support for Multi-USIM Devices", Newport Beach, CA, USA, Jun. 5-7, 2019, pp. 3.Source: SA1 (from S1-191635), Title: Proposed WID on Support for Multi-USIM Devices (MUSIM) Document for: Approval, Agenda Item: 6.3 3GPP™.

Charter Communications: Network Switching for Multi-SIM UEs 11, 3GPP Draft; R2-2100725, 3rd Generation Partnership Project (3GPP), Mobile Competence Centre ; 650, Route Des Lucioles ; F-06921 Sophia-Antipolis Cedex; France , vol. RAN WG2, No. Electronic; Jan. 25, 2021-Feb. 5, 2021, Jan. 5, 2021 (Jan. 15, 2021), pp. 1-4, XP051973833.

International Search Report, PCT/US2021/016550, dated May 21, 2021, pp. 1-4.

Nokia, et al.: "Scenarios and Impact analysis for Switching Notification", 3GPP Draft; R2-2009265, 3rd Generation Partnership Project (3GPP), Mobile Competence Centre ; 650, Route Des Lucioles ; F-06921 Sophia-Antipolis Cedex ; France, vol. Ran WG2, No. Electronic; Nov. 2, 2020-Nov. 13, Oct. 22, 2020(Oct. 22, 2020), pp. 1-7, XP051941286.

SA WG2 Meeting #13, 6AH S2-2000790, F "S_Musim: NAS-triggered graceful RRC release" (revision of S2-20nnnnn), Jan. 13-17, 2020, pp. 6, Incheon, Korea.

"3rd Generation Partnership Project; Technical Specification Group Services and System Aspects; Study on system enablers for devices having multiple Universal Subscriber Identity Modules (USIM) (Release 17)", 3GPP Standard; Technical Report; 3GPP TR 23.761, 3rd Generation Partnership Project (3GPP), Mobile Competence Centre; 650, Route Des Lucioles ; F-06921 Sophia-Antipolis Cedex ; France, vol. SA WG2, No. V0.2.0, Dec. 6, 2019 (Dec. 6, 2019), pp. 1-19, XP051840713.

* cited by examiner

```
-- ASN1START
-- TAG-UEASSISTANCEINFORMATION-START

UEAssistanceInformation ::=    SEQUENCE {
    criticalExtensions              CHOICE {
        ueAssistanceInformation         UEAssistanceInformation-IEs,
        criticalExtensionsFuture        SEQUENCE {}
    }
}

UEAssistanceInformation-IEs ::= SEQUENCE {
    delayBudgetReport               DelayBudgetReport                       OPTIONAL,
    lateNonCriticalExtension        OCTET STRING                            OPTIONAL,
    nonCriticalExtension            UEAssistanceInformation-v1540-IEs   OPTIONAL
}

DelayBudgetReport::=            CHOICE {
    type1                           ENUMERATED {
                                        msMinus1280, msMinus640, msMinus320, msMinus160,msMinus80, msMinus60, msMinus40,
                                        msMinus20, ms0, ms20,ms40, ms60, ms80, ms160, ms320, ms640, ms1280},
    ...
}

UEAssistanceInformation-v1540-IEs ::= SEQUENCE {
    overheatingAssistance           OverheatingAssistance                   OPTIONAL,
    multiSIMAssistance              MultiSIMAssistance                      OPTIONAL,
    nonCriticalExtension            SEQUENCE {}                             OPTIONAL
}
```

FIG. 5

```
OverheatingAssistance ::=        SEQUENCE {
    reducedMaxCCs                SEQUENCE {
        reducedCCsDL             INTEGER (0..31),
        reducedCCsUL             INTEGER (0..31)
    } OPTIONAL,
    reducedMaxBW-FR1             SEQUENCE {
        reducedBW-FR1-DL         ReducedAggregatedBandwidth,
        reducedBW-FR1-UL         ReducedAggregatedBandwidth
    } OPTIONAL,
    reducedMaxBW-FR2             SEQUENCE {
        reducedBW-FR2-DL         ReducedAggregatedBandwidth,
        reducedBW-FR2-UL         ReducedAggregatedBandwidth
    } OPTIONAL,
    reducedMaxMIMO-LayersFR1     SEQUENCE {
        reducedMIMO-LayersFR1-DL MIMO-LayersDL,
        reducedMIMO-LayersFR1-UL MIMO-LayersUL
    } OPTIONAL,
    reducedMaxMIMO-LayersFR2     SEQUENCE {
        reducedMIMO-LayersFR2-DL MIMO-LayersDL,
        reducedMIMO-LayersFR2-UL MIMO-LayersUL
    } OPTIONAL
}

ReducedAggregatedBandwidth ::= ENUMERATED {mhz0, mhz10, mhz20, mhz30, mhz40, mhz50, mhz60, mhz80,
mhz100, mhz200, mhz300, mhz400}

MultiSIMAssistance ::=       SEQUENCE {
    multiSIMTuneAwayTimer    ENUMERATED {us8dot33, us16dot69, us29dot19, us33dot2, us66dot4, us116dot2,
                             us132dot8, us133dot4, us266dot8, us466dot9},
    miniSlotMultiplier INTEGER (1..2000)
}

-- TAG-UEASSISTANCEINFORMATION-STOP
-- ASN1STOP
```

FIG. 6

WIRELESS NETWORK SWITCHOVER VIA TUNE-AWAY NOTIFICATIONS

RELATED APPLICATION

This application is a continuation application of earlier filed U.S. patent application Ser. No. 16/789,280 entitled "WIRELESS NETWORK SWITCHOVER VIA TUNE-AWAY NOTIFICATIONS," filed on Feb. 12, 2020, the entire teachings of which are incorporated herein by this reference.

BACKGROUND

Conventional wireless networks such as 3GPP specifications only define association of 1 SIM (Subscriber Identity Module) to 1 network (PLMN) for a single mobile communication device (a.k.a., UE or User Equipment).

However, in many countries across the world, there is a need to have two or more SIMs associated with the same UE, e.g., one SIM is a subscription used for "work" purposes while the second SIM is a subscription used for "personal or home" purposes.

Another example of multiple SIM (herewith referred to as MUSIM, multi-SIM) use-case is to have one SIM with subscription for "voice-only" service, while the second SIM with subscription for "data" services. Given the lack of a globally harmonized standardized solution, various involved entities (such as chipset manufacturers, device OEMs, network vendors, etc.) have filled the market demand for above mentioned use-cases.

One issue associated with use of multiple SIMs in a respective mobile communication device is switchover from one wireless network to another.

BRIEF DESCRIPTION OF EMBODIMENTS

There are deficiencies associated with conventional techniques of supporting switchover from one network to another. The above requirements of requiring multiple SIMs in a single mobile communication device has an undesirable side-effect. For example, UEs with limited Tx and Rx hardware chain capacity (e.g. only a single Tx chain available to support wireless connectivity) would tune-away when in RRC CONNECTED mode with respect to Network A to listen for paging information from Network B. This in turn results in either missed pages on Network A or dropped packets on Network A.

Embodiments herein provide improved use of allocated resources to support wireless communications.

More specifically, one embodiment herein includes user equipment (mobile communication device) operated in a wireless network environment. While the user equipment is wirelessly connected to a first wireless base station over a first wireless communication link, a communication management resource in the user equipment receives input (such as a request) to switchover the user equipment to connecting to a second wireless base station providing corresponding wireless services. To facilitate a tune-away to a second wireless network, the communication management resource of the user equipment generates timing information associated with the switchover. In furtherance of the switchover (tune-away) to the second wireless base station, the communication management resource of the user equipment transmits the timing information in a wireless communication over the first wireless communication link to the first wireless base station.

In one embodiment, the timing information indicates timing attributes of the switchover (such as when the mobile communication device will initiate) of the user equipment from the first wireless base station to the second wireless base station.

In yet further example embodiments, via communications between the user equipment and the second wireless base station, the communication management resource of the user equipment determines a duration of time needed to establish connectivity (such as duration of time of the tune-away) between the user equipment and the second wireless base station. The communication management resource of the user equipment generates the timing information based on the determined duration of time needed to effectuate the switchover of connecting the user equipment from the first wireless base station to the second wireless base station.

In still further example embodiments, the timing information includes a first portion and a second portion. The first portion specifies a time value; the second portion specifies a multiplier value applicable to the time value. In one embodiment, a combination of the time value and multiplier indicates a time duration (such as a tune-away duration) in which the user equipment plans to complete the switchover from the first wireless base station to the second wireless base station. In accordance with further embodiments, a time value in the timing information indicates the duration of the tune-away. In one embodiment, this informs the first wireless network (first wireless base station) how long the user equipment may be unavailable to monitor the first wireless network for paging notifications or other communications.

In yet further embodiments, the user equipment includes multiple radio chains of antenna hardware (such as chains of receiver hardware and/or chains of transmitter hardware) initially supporting communications over the first wireless communication link prior to the tune-away. The timing information specifies a duration of time in which the radio chains of antenna hardware in the user equipment is not available to communicate with the first wireless base station. Accordingly, the first wireless base station is notified that one or more chains of antenna hardware will no longer be used to communicate with the first wireless base station.

If desired, the first wireless base station can be notified of the switchover to the second wireless base station. However, in one embodiment, the user equipment provides no indication to the first wireless base station that any of the one or more chains of antenna hardware is or will be used to communicate with the second wireless base station. In one embodiment, receipt of the tune-away notification from the user equipment prompts the first wireless network to reduce a number of MIMO layer used to communicate data from the wireless network to the user equipment.

Yet further embodiments herein include, via the communication management resource in the user equipment, generating and transmitting the timing information from the user equipment to the first wireless base station (and thus first wireless network) in response to the user equipment allocating multiple chains of antenna hardware in the user equipment currently used to communicate with the first wireless base station to support subsequent communications between the user equipment and the second wireless base station.

In still further example embodiments, the user equipment establishes the first wireless communication link via a first SIM (Subscriber Identity Module) assigned to a user of the user equipment. The communication management resource of the user equipment transmits the timing information in a wireless communication over the first wireless communication link to the first wireless base station in furtherance of the communication management resource and corresponding user equipment establishing or maintaining a second wireless communication link between the user equipment and the second wireless base station via a second SIM (Subscriber Identity Module) assigned to the user.

In still further example embodiments, the first wireless base station is disposed in a first wireless network of multiple wireless base stations operated by a first wireless service provider; the second wireless base station is disposed in a second wireless network of multiple wireless base stations operated by a second wireless service provider independent of the first wireless service provider. Each of the wireless service providers can provide different services.

For example, in one embodiment, the first wireless network of base stations operated by the first wireless network service provider can be to support data communications (such as non-voice communications or non-telephony communications); the second wireless network of the base stations operated by the second wireless network service provider can be to support telephony communications (such as voice communications).

Further embodiments herein include, via the communication management resource, operating the user equipment in different modes. For example, in a first mode (or first time window), prior to receiving the input to perform the switchover of connecting the user equipment from the first wireless base station to the second wireless base station, the communication management resource of the user equipment implements multiple chains of antenna hardware in the user equipment to communicate with the first wireless base station. In a second mode (or second time window), subsequent to transmitting the timing information and prior to expiration of a time duration specified by the timing information, the communication management resource of the user equipment utilizes a first portion of the multiple chains of antenna hardware in the user equipment to (continue to) communicate with the first wireless base station while utilizing a second portion (freed portion) of the multiple chains of antenna hardware in the user equipment to communicate with the second wireless base station. In a third window, subsequent to transmitting the timing information and corresponding expiration of a time duration specified by the timing information, the communication management resource of the user equipment operates in the first mode again in which the communication management resource utilizes the multiple chains of antenna hardware in the user equipment to communicate with the first wireless base station.

In accordance with further example embodiments, the transmission of the timing information from the user equipment to the first wireless base station provides notification to the first wireless base station and the first wireless network that the user equipment has planned discontinued use of one or more chains of multiple antennas in the user equipment. As previously discussed, in one embodiment, the user equipment provides no indication as to why the user equipment transmits the timing information or that it is in furtherance of re-allocating or re-using antenna hardware resources to communicate with the second wireless base station instead of the first wireless base station.

Alternatively, in one embodiment, the timing information supplied to the first wireless base station indicates a tune-away (such as permanent or temporary) of the user equipment from the first wireless base station to the second wireless base station or at least intended discontinued use of communicating with the first wireless base station using antenna hardware of the user equipment.

The timing information can be transmitted in any suitable message from the user equipment to the first wireless base station. In one embodiment, the communication management resource of the user equipment transmits the timing information in a so-called UE Assistance Information message from the user equipment to the first wireless base station. As previously discussed, such a message provides notification to the first wireless base station that the user equipment intends to or needs to adjust or modify how antenna hardware in the user equipment is currently used.

In one embodiment, as previously discussed, the timing information from the mobile communication device indicates a planned temporary switchover of the mobile communication device from the first wireless network to the second wireless network. Transmission of the switchover notification to the first wireless network informs the first wireless network of the planned temporary switchover.

Further embodiments herein include, at the mobile communication device, receiving a paging notification from the first wireless network. The mobile communication device produces an acknowledgement message acknowledging receipt of the paging notification by the mobile communication device from the first network. The mobile communication device then communicates the acknowledgement message from the mobile communication device to the first wireless network. In one embodiment, the acknowledgement message includes the switchover notification indicating the temporary planned switchover.

In accordance with further example embodiments, the planned switchover notification indicates a duration of time in which the mobile communication device is scheduled to be unavailable to monitor for receipt of paging notifications from the first wireless network.

In accordance with still further example embodiments, the planned switchover includes a temporary tune-away of wireless antenna hardware of the mobile communication device from the first wireless network to the second wireless network. Subsequent to the temporary tune-away of the antenna hardware, the mobile communication device utilizes the wireless hardware to monitor a paging notification channel of the first wireless network again using the one or more chains of antenna hardware.

In accordance with yet further example embodiments, the first wireless network terminates communication of paging notifications to the mobile communication device during the planned temporary switchover because it is known by the first wireless network that the mobile communication device will not receive them.

In still further example embodiments, the planned temporary switchover notification from the mobile communication device (or other suitable entity) indicates a duration of time that the mobile communication device is scheduled to tune corresponding antenna hardware to the second wireless network instead of the first wireless network. The mobile communication device tunes the antenna hardware back to the first wireless network subsequent to expiration of the duration of time.

Embodiments herein are useful over conventional techniques because they provide a unique way of notifying a wireless base station of a switchover to a second wireless base station.

In accordance with further example embodiments, a wireless network environment includes a first wireless network, a second network, and user equipment (such as a mobile communication device). The user equipment receives paging notifications from the first wireless network. In response to receiving input while the user equipment is wirelessly connected to the first wireless network, the user equipment generates a switchover notification indicating a planned temporary switchover of the user equipment to the second wireless network. The user equipment then transmits the switchover notification to the first wireless network, the switchover notification informing the first wireless network of the planned temporary switchover.

In one embodiment, the switchover notification from the user equipment is or includes an acknowledgement message communicated to the first wireless network. As an illustrative example, assume that the user equipment receives a paging notification from the first wireless network. The user equipment produces an acknowledgement message acknowledging receipt of the paging notification by the user equipment from the first network. The user equipment then communicates the acknowledgement message from the user equipment to the first wireless network. In one nonlimiting example embodiment, the acknowledgement message from the user equipment includes the switchover notification indicating the temporary planned switchover of the user equipment from the first wireless network to the second wireless network.

Subsequent to the temporary switchover, the user equipment switches back to the first wireless network.

In accordance with further example embodiments, the planned switchover notification from the user equipment indicates a duration of time in which the mobile communication device is scheduled to be unavailable to monitor for receipt of paging notifications from the first wireless network. Accordingly, the first wireless network has no expectation of the user equipment receiving paging notifications during the switchover duration. However, the first wireless network may have an expectation that the user equipment will be able to receive paging notifications from the first wireless network after expiration of the time duration.

Assume that, while monitoring a paging notification channel of the second wireless network during the planned temporary switchover, the user equipment detects a paging notification directed to the user equipment. Such a paging notification from the second wireless network (and corresponding wireless paging channel) may indicate a paging notification such as a grant of wireless resources associated with the second wireless network to the user equipment. This may prevent the user equipment from switching back to monitoring the wireless paging channel from monitoring the wireless paging channel of the first wireless network within the original amount of time as previously indicated by the user equipment. In other words, in one embodiment, the user equipment will be late to switching back to monitoring the wireless paging channel of the first wireless network again. In such an instance, the first wireless network terminates communication of paging notifications to the mobile communication device over its wireless paging channel during the original and extended planned temporary switchover.

In one embodiment, in response to detecting a need by the user equipment to extend a duration of the tune-away to the second wireless network, the user equipment generates a communication indicating an update to a switchover duration previously indicated by the user equipment to the first wireless network. The user equipment transmits the communication to the first wireless network after the user equipment has switched over to the second wireless network. This informs the first wireless network of the extended tune-away condition, overriding the original tune-away duration notification.

In such an instance, in one embodiment, in response to detecting the paging notification from the second wireless network, the user equipment communicates an updated planned switchover notification over a wireless communication link to the first wireless network. The updated planned switchover notification informs the first wireless network that the initial planned duration of the temporary switchover of the user equipment to the second wireless network has been extended or delayed. In one embodiment, the updated planned switchover indicates how long the user equipment will be delayed (or end time of the extended tune-away duration) in monitoring the wireless paging channel of the first wireless network again.

Thus, based on receiving notification that the user equipment will be delayed, the first wireless network can delay sending paging notifications on its corresponding wireless paging channel until a time at which it is known that the user equipment will be monitoring the wireless paging channel of the first wireless network again.

In accordance with further embodiments, the switchover includes a temporary tune-away of all or a portion of wireless antenna hardware in communication with the first wireless network to the second wireless network. The temporary tune-away of the wireless hardware can include operations such as: subsequent to the temporary tune-away, utilizing the wireless hardware to monitor the paging notification channel of the first wireless network again.

More specifically, in one embodiment, the planned temporary switchover notification indicates a duration of time that the mobile communication device tunes corresponding antenna hardware to the second wireless network instead of the first wireless network. The user equipment tunes its antenna hardware back to the first wireless network subsequent to expiration of the duration of time as specified by the switchover notification or after expiration of time as specified by the updated temporary switchover notification.

In still further example embodiments, the first paging notifications are associated with a first SIM (Subscriber Identity Module) assigned to the mobile communication device; the first SIM (such as provided to the mobile communication device by a first wireless network service provider) provides the mobile communication device use of the first wireless network. The second paging notifications are associated with a second SIM (Subscriber Identity Module) assigned to the mobile communication device; the second SIM (such as provided to the mobile communication device by a second wireless network service provider) provides the mobile communication device use of the second wireless network.

Note that any of the resources as discussed herein can include one or more computerized devices, mobile communication devices, sensors, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon. The instructions, when executed by the computer processor hardware, cause the computer processor hardware (such as one or more co-located or disparately processor devices or hardware) to: while user equipment is wirelessly connected to a first wireless base station over a first wireless communication link, receive input at the user equipment to switchover the user equipment to a second wireless base station; generate timing information associated with the switchover; and transmit the timing information in a wireless communication over the first wireless communication link to the first wireless base station, the timing information indicating timing attributes of the switchover of the user equipment from the first wireless base station to the second wireless base station.

One embodiment includes a computer readable storage medium and/or system having instructions stored thereon. The instructions, when executed by the computer processor hardware, cause the computer processor hardware (such as one or more co-located or disparately processor devices or hardware) to: at user equipment, receiving paging notifications from a first wireless network; in response to receiving input while the user equipment is wirelessly connected to the first wireless network, generating a switchover notification indicating a planned temporary switchover of the user equipment to a second wireless network; and transmitting the switchover notification to the first wireless network, the switchover notification informing the first wireless network of the planned temporary switchover.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing dynamic data flow prioritization that varies depending on current network conditions. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

BRIEF DESCRIPTION OF THE DRAWINGS

FIGS. 5 and 6 are an example diagram illustrating executable code supporting a tune-away according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DESCRIPTION OF EMBODIMENTS

According to one configuration, while the user equipment is wirelessly connected to a first wireless base station over a first wireless communication link, a communication management resource in the user equipment receives input (such as a request) to tune-away the user equipment to a second wireless base station providing corresponding wireless services. To facilitate the temporary tune-away to the second wireless network, the communication management resource of the user equipment generates timing information associated with the switchover. In furtherance of the switchover (tune-away) to the second wireless base station, the communication management resource of the user equipment transmits the timing information in a wireless communication over the first wireless communication link to the first wireless base station.

Figure 1:
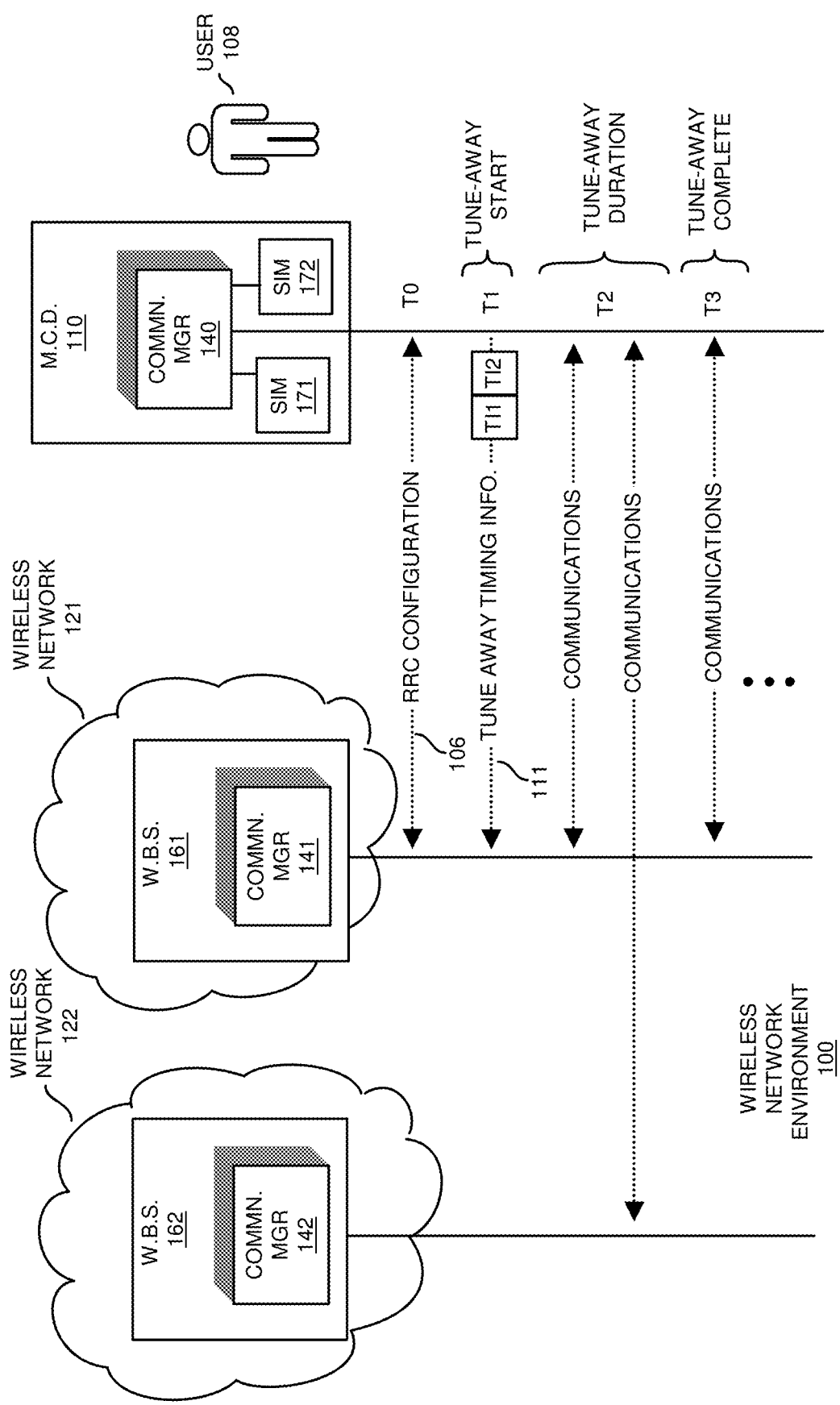
FIG. 1 is an example diagram illustrating a tune-away transition of a mobile communication device (user equipment) from a first wireless network to a second wireless network according to embodiments herein.

More specifically, with reference to the drawings, FIG. 1 is an example diagram illustrating a temporary tune-away of a mobile communication device from a first wireless network to a second wireless network according to embodiments herein.

In this example embodiment, the wireless network environment 100 includes a mobile communication device 110, wireless base station 161, and wireless base station 162. Wireless base station 161 resides in wireless network 121. Wireless base station 162 resides in wireless network 122.

As further shown, communication manager 140 provides communication management and control associated with the mobile communication device 110 as described herein.

Communication manager 141 provides communication management and control associated with the wireless base station 161 (and thus corresponding wireless network 121) as described herein.

Communication manager 142 provides communication management and control associated with wireless base station 162 (and thus corresponding wireless network 122) as described herein.

In one embodiment, user 108 operating the mobile communication device 110 subscribes to use of both wireless network 121 and wireless network 122, which operate independently of each other.

As an illustrative example, assume that the mobile communication device 110 is assigned a first SIM 171 (Subscriber Identity Module) provided by a first wireless network service provider to use the first wireless network 121 and corresponding wireless connectivity provided by wireless network 121. In such an instance, the first SIM 171 is assigned to the mobile communication device 110 and provides connectivity to the first wireless network 121.

The mobile communication device 110 is also assigned a second SIM (Subscriber Identity Module) 172 via a second wireless network service provider to use the second wireless network 122 and corresponding wireless connectivity provided by wireless network 122. In such an instance, the second SIM 172 is assigned to the mobile communication device 110 and provides connectivity to the second wireless network 122.

In certain instances, note that the first SIM 171 and the second SIM 172 are provided by a same wireless network service provider. Alternatively, as previously discussed, the first SIM 171 and the second SIM 172 are provided by different wireless network service providers.

In accordance with further example embodiments, the first wireless network 121 supports a first type of wireless communications such as voice or telephony communications. The second wireless network 122 supports a second type of wireless communications such as data communications (such as supporting web page retrieval, email retrieval, video content delivery, etc.).

Thus, each of the wireless service providers can provide different services. For example, in one embodiment, the first wireless network of base stations operated by the first wireless network service provider can be to support data communications (such as non-voice communications or non-telephone communications); the second wireless network of the base stations operated by the second wireless network service provider can be to support telephony communications (such as voice communications).

In general, a SIM is an integrated circuit that securely stores information such as the international mobile subscriber identity (IMSI). In one embodiment, a SIM is a memory chip that enables a respective user to receive and establish phone calls via the mobile communication device 110. The identity information provides a way to send communications to the mobile communication device 110.

As further shown in FIG. 1, in one nonlimiting example embodiment, via communications 106 between the mobile communication device 110 and the wireless base station 161, the mobile communication device and wireless base station 161 establish ACTIVE connectivity (such as supporting one or more downlink MIMO layers) via the RRC (Radio Resource Control) configuration protocol.

In further example embodiments, while the mobile communication device 110 (a.k.a., user equipment) is wirelessly connected to and/or in communication the first wireless base station 161 over a respective wireless communication link, the communication manager 140 in the mobile communication device 110 receives input (such as a request, command, etc.) to switchover the mobile communication device 110 to connecting to a second wireless base station 162 providing corresponding wireless services. The input to the communication manager 140 can be generated in response to a need to switchover and monitor communications from the second wireless network 122.

Up to time T1, the mobile communication device 110 is wirelessly connected to receive communications from the wireless base station 161. Assume that no antenna hardware resources of the mobile communication device 110 are used to support connectivity with the wireless base station 162 prior to time T1.

In one embodiment, at or around time T1, the mobile communication device 110 decides to fully or partially tune-away to wireless network 122. In one embodiment, the wireless network 121 and wireless network 122 operate independently and do not provide notification of network conditions or settings associated with the mobile communication device 110 to each other.

To facilitate the tune-away switchover to the second wireless network 122, the communication manager 140 of the mobile communication device 110 generates timing information 111 (such as tune-away timing information) associated with the upcoming switchover. In furtherance of initiating the switchover (tune-away) to the second wireless base station 162, the communication manager 140 of the mobile communication device 110 transmits the timing information 111 in a wireless communication over a respective wireless communication link to the first wireless base station 161.

In accordance with further example embodiments, when configured to do so, the mobile communication device 110 communicates timing information 111 as a unidirectional message such as a UEAssistanceInformation message from the mobile communication device 110 to the wireless base station 161. Thus, if the mobile communication device 110 prefers an adjustment in the connected mode DRX cycle length, or if it is experiencing internal overheating, or if it needs to free up or re-instate transmit or receive chains for Multi-SIM purposes (such as to receive communications from the second wireless network 162), the mobile communication device 110 communicates the timing information 111 in a UEAssistanceInformation message from the mobile communication device 110 to the wireless base station 161. In the latter two cases, the mobile communication device 110 can be configured to express a preference for temporarily reducing the number of maximum secondary component carriers, the maximum aggregated bandwidth and the number of maximum MIMO layers from the wireless base station 161. In both cases, it is up to the communication manager 141 (such as gNB) whether to accommodate the request.

Note that the timing information 111 transmitted in respective communications from the mobile communication device 110 to the wireless base station 161 can include any suitable information. In one embodiment, the mobile communication device 110 produces the timing information 111 to indicate timing attributes of the switchover such as a particular time T1 when the mobile communication device 110 will initiate (start) the switchover of the mobile communication device from the first wireless base station 161 to the second wireless base station 162.

In yet further example embodiments, the communication manager 140 of the mobile communication device 110 determines a duration of time needed to establish connectivity between the mobile communication device 110 and the second wireless base station 162. In other words, the timing information 111 indicates or takes into account a duration of time in which the mobile communication device 110 is going to temporarily tune to receive communications from the second wireless network 122.

In one embodiment, the communication manager 141 of the mobile communication device 110 generates the timing information 111 based on the determined duration of time needed to effectuate the switchover of connecting the mobile communication device 110 from the first wireless base station 161 to the second wireless base station 162 as well as receive any communications from the wireless network 122 before switching back to tuning to the wireless network 121 again.

In still further example embodiments, note that the timing information 111 optionally includes a first portion TI1 and a second portion TI2.

In one non-limiting example embodiment, the first portion TI1 of the timing information 111 specifies a time value; the second portion TI2 of timing information 111 specifies a multiplier value applicable to the time value. In such an instance, a combination of the time value in the first portion TI1 and multiplier in TI2 indicates a total time duration (time value*multiplier value=total time duration) in which the mobile communication device plans to complete the switchover (such as tune-away) from the first wireless base station 161 to the second wireless base station 162.

Thus, prior to time T1, the mobile communication device 110 is in wireless communication with only the wireless network 121. During the tune away duration between time T1 and T3, the mobile communication device 110 supports connectivity between the mobile communication device 110 and both wireless network 121 and between the mobile communication device 110 and the wireless network 122. Subsequent to time T3, after the tune-away transition is complete, the mobile communication device 110 is in communication with wireless network 121 again. Alternatively, the communication device 110 can completely switchover to connecting only to the second wireless network 122.

The example embodiment herein describes temporary tune-away from a first wireless network to a second wireless network. Note that the mobile communication device 110 can be in communication with any number of different wireless networks. In such an instance, the mobile communication device 110 communicates timing information to any of one or more wireless networks from which the mobile communication device 110 tunes away. In a manner as described herein, the one or more wireless networks (and corresponding wireless base stations) receiving the tune-away notification and timing information from the mobile communication device 110 know not to communicate paging notifications to the mobile communication device 110 during the specified time duration since the mobile communication device 110 will be tuned to monitor paging notifications from another wireless base station.

Figure 2:
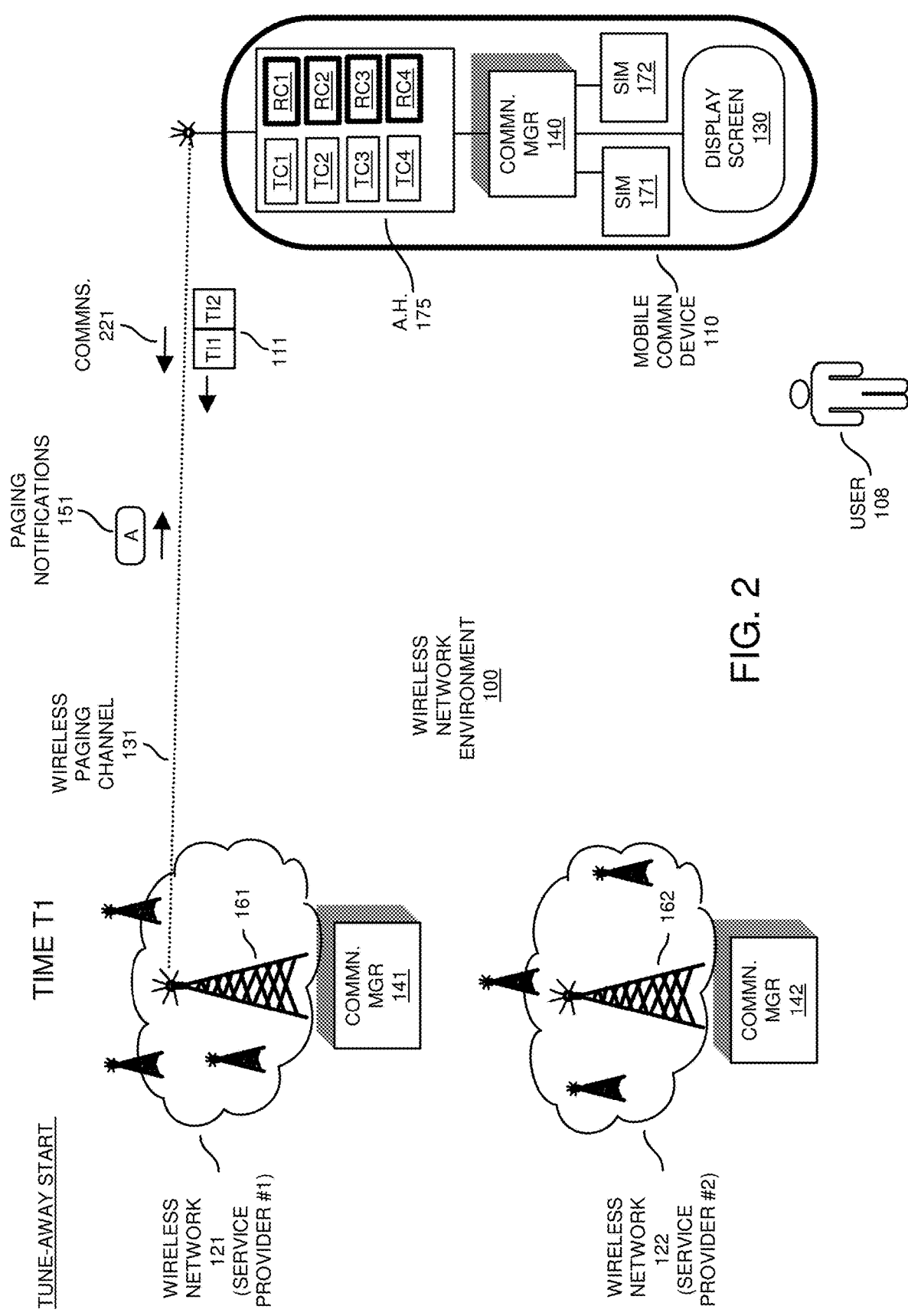
FIG. 2 is an example diagram illustrating initiation of a tune-away of a mobile communication device from a first wireless network to a second wireless network according to embodiments herein.

FIG. 2 is an example diagram illustrating initiation of a tune-away transition of a mobile communication device from a first wireless network to a second wireless network according to embodiments herein.

As shown in FIG. 2, the wireless network 121 generates wireless paging channel 131 over which paging notifications 151 are communicated to the mobile communication device 110 and any other mobile communication devices in the wireless network environment 100 in communication with the wireless base station 161. One or more paging occasion and paging frame of the wireless paging channel are allocated in the wireless paging channel 131 to the mobile communication device 110 to receive paging notifications on a cyclical basis from the wireless network 121.

In one embodiment, the mobile communication device 110 includes multiple radio chains of antenna hardware (such as receiver chain hardware RC1, receiver chain hardware RC2, receiver chain hardware RC3, receiver chain hardware RC4 and transmitter chain hardware TC1, transmitter chain hardware TC2, transmitter chain hardware TC3, transmitter chain hardware TC4) supporting communications with the wireless base station 161 up until time T1.

Note that initial communications between the mobile communication device 110 and the wireless base station 161 can include the mobile communication device 110 notifying the wireless base station 161 of its antenna hardware capability such as its number of available Rx and/or Tx chains. Based on such information, the wireless base station 161 then controls use of the antenna hardware 175 and available chains to support wireless connectivity with the wireless base station 161.

Embodiments herein include a way to account for a mobile communication device's request to temporarily or permanently tune-away one or more Rx chains involved in CONNECTED mode operation.

As an illustrative example, in one embodiment, in order to initiate a tune-away to the wireless base station 162, such as tune-away of all or a portion of its antenna hardware 175 to communicate with the wireless base station 162, the mobile communication device 110 communicates the communications 221 (such as including timing information 111) to the wireless base station 161.

Receipt of communications 221 results in the wireless base station 161 relaxing a requirement that the mobile communication device 110 use all of its receiver chains (receiver chain hardware RC1, receiver chain hardware RC2, receiver chain hardware RC3, and receiver chain hardware RC4) to receive communications from the wireless base station 161. In such an instance, during the tune-away away time between T1 and time T3 as specified by the timing information 111, the mobile communication device 110 uses one or more (or all) of its receiver chains (RC1, RC2, RC3, and RC4) to receive communications from the wireless base station 162 in wireless network 122.

In response to detecting operating conditions such as that the user 108 or other suitable entity would like to or needs to switchover its respective antenna hardware 175 to receiving communications from the wireless network 122, the communication manager 140 of the mobile communication device 110 transmits communications 221 over a respective wireless communication link to the communication manager 141 of wireless base station 161. In one embodiment, as previously discussed, the communications include timing information 111 such as timing information TI1 and timing information TI2.

In one embodiment, the communications 221 is or includes a unidirectional message from mobile communication device 110 to the wireless base station 161 in which the wireless base station 161 does not respond to the mobile communication device 110.

Note further that communications 221 can be conveyed in any suitable manner such as at the physical layer, MAC layer, RFC layer, etc.

Assume in this example embodiment that the mobile communication device 110 configures the receiver chain hardware RC1, receiver chain hardware RC2, receiver chain hardware RC3, and receiver chain hardware RC4 of antenna hardware 175 to receive communications from the wireless base station 161 up until time T1.

In one nonlimiting example embodiment, the timing information 111 communicated at or around time T1 indicates a duration of time after which the one or more radio chains of antenna hardware 175 (such receiver chain hardware RC1, receiver chain hardware RC2, receiver chain hardware RC3, and/or receiver chain hardware RC4) in the mobile communication device 110 will no longer be used to receive communications from the wireless base station 161.

More specifically, up until time T1, the communication manager 140 configures the one or more receiver chain hardware (such as the receiver chain hardware RC1, receiver chain hardware RC2, receiver chain hardware RC3, and receiver chain hardware RC4 of antenna hardware 175) associated with the mobile communication device 110 to receive communications from the wireless base station 161.

As further discussed below, between time T1 and time T3, the communication manager 140 uses a first portion of the antenna hardware 175 to monitor and receive communications (such as paging notifications or other data) from the first wireless network 121; the communication manager 140 uses a second portion of the antenna hardware 175 to monitor and receive communications (such as paging notifications or other data) from the second wireless network 122.

Figure 3:
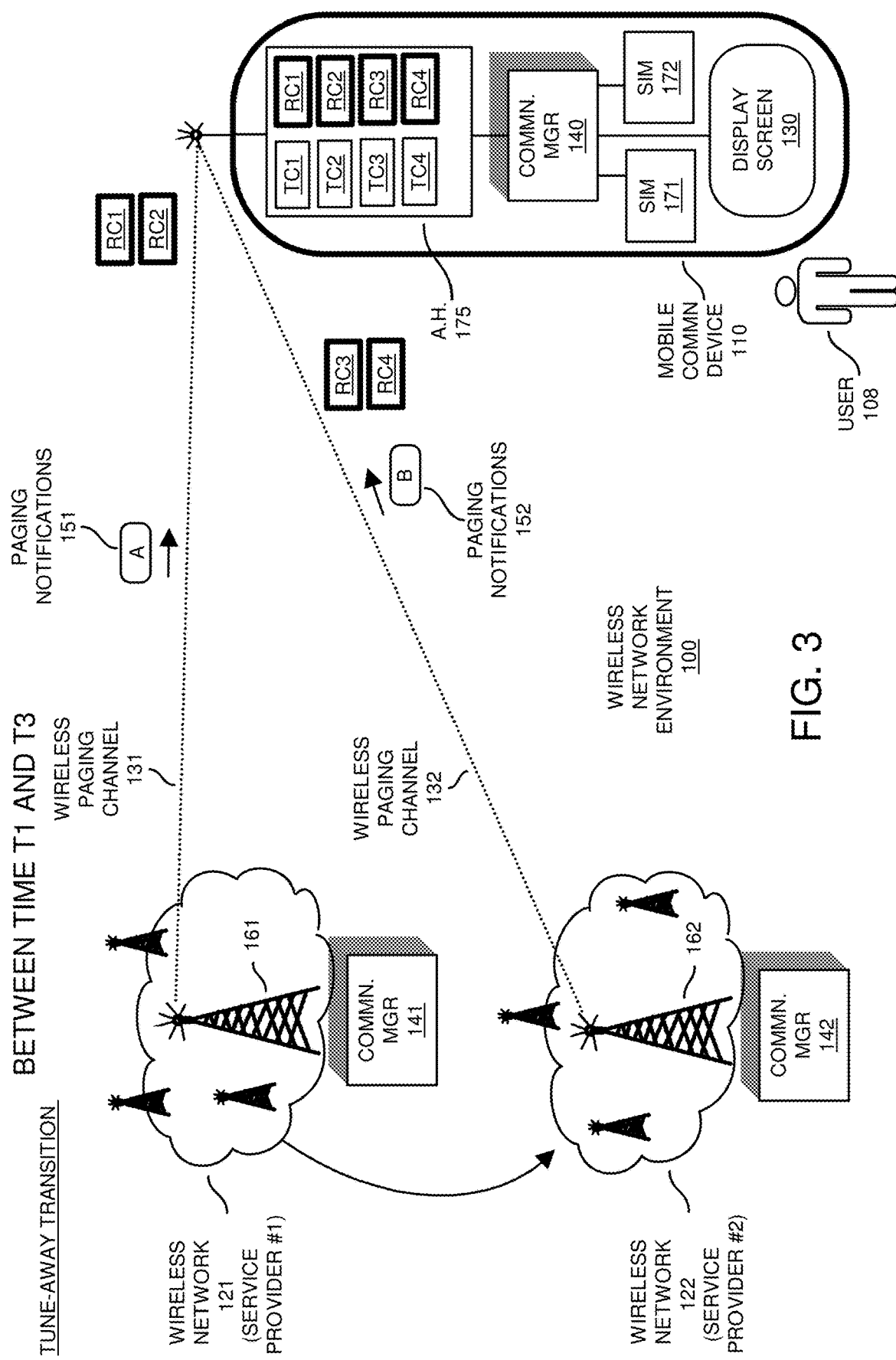
FIG. 3 is an example diagram illustrating a tune-away of a mobile communication device from a first wireless network to a second wireless network according to embodiments herein.

FIG. 3 is an example diagram illustrating a tune-away transition of a mobile communication device from a first wireless network to a second wireless network according to embodiments herein.

Based on transmission of the communications 221, the communication manager 140 notifies the wireless base station 161 and corresponding network of a tune-away condition in which the communication manager 140 terminates use of all or a portion of the antenna hardware 175 (such as receiver chain hardware RC1, receiver chain hardware RC2, receiver chain hardware RC3, and receiver chain hardware RC4 of antenna hardware 175 or just receiver chain hardware RC3 and receiver chain hardware RC4) to monitor and receive the communications from the wireless base station 161.

Between time T1 and time T3, reduction of the number receiver Rx chains used to receive communications from the wireless base station 161 may reduce the number of MIMO layers (such as from 8 to 4) supported between the wireless base station 161 and the mobile communication device 110.

In one embodiment, as shown, during the tune-away between time T1 and time T3, the communication manager 140 uses a portion of the receiver chain hardware RC1 and RC2 to monitor and receive communications from wireless base station 161; the communication manager 140 uses receiver chain hardware RC3 and RC4 to monitor and receive communications from the wireless network 122 and corresponding wireless base station 162.

Accordingly, via communications 221, the first wireless base station 161 is notified that one or more chains of antenna hardware 175 will no longer be used to communicate with the first wireless base station 161. If desired, via communications 221, the first wireless base station 161 can be notified with specific information indicating that a portion of the receiver chain hardware will be used to communicate with the wireless network 122.

Alternatively, in another embodiment, the mobile communication device 110 provides no indication in communications to the first wireless base station 161 that any of the one or more transmitter or receiver chains of antenna hardware 175 is or will be used to communicate with the second wireless base station 162 for the duration as specified by the timing information 111. For example, the communications 221 may only indicate a tune-away condition in a manner as previously discussed using timing information 111 indicating any or all information such as start time of the tune-away to the wireless base station 162, duration of the tune-away to wireless base station 162, end time of the tune-away with the wireless base station 162, etc.

As previously discussed, the timing information 111 can be transmitted in any suitable message from the mobile communication device 110 to the first wireless base station 161. In one embodiment, the communication manager 140 of the mobile communication device 110 transmits the timing information 111 in a so-called UE Assistance Information message from the mobile communication device 110 to the first wireless base station 161.

As previously discussed, such communications 221 provide notification to the first wireless base station 161 that the mobile communication device 110 intends or needs to adjust or modify how antenna hardware 175 in the mobile communication device 110 is currently used.

Via communications 221, and notification of the temporary tune-away, the wireless base station 161 is made aware not to increase the number of MIMO layers to the mobile communication device 110 during the tune-away duration as specified by the timing information 111 in communications 221. In other words, in response to receiving the communications 221 of the tune-away, during the tune-away, the wireless base station 161 does not attempt to increase a number of MIMO layers associated with downlink communications from the wireless base station 161 to the mobile communication device 110.

Figure 4:
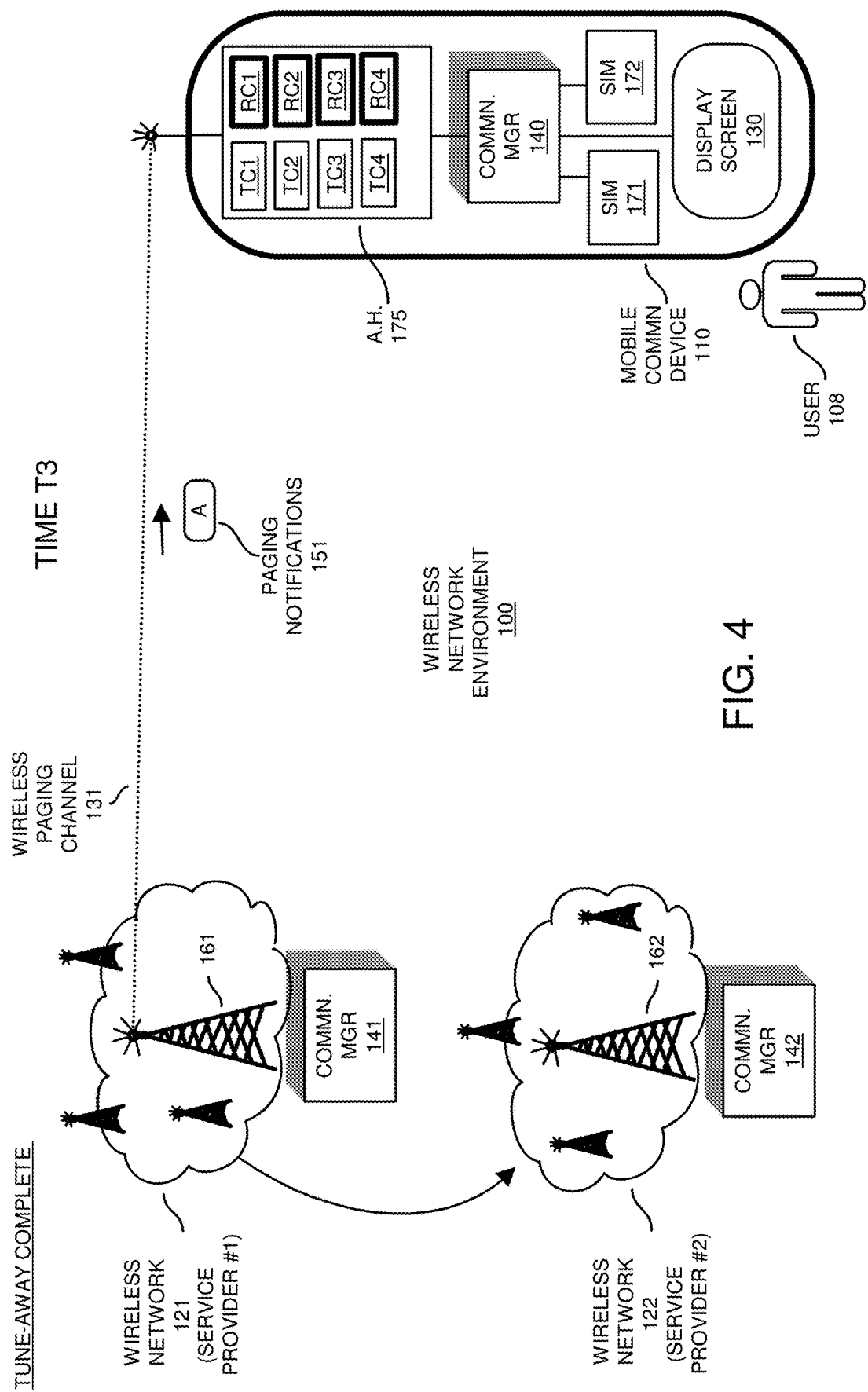
FIG. 4 is an example diagram illustrating completion of a temporary tune-away according to embodiments herein.

FIG. 4 is an example diagram illustrating completion of a tune-away of a mobile communication device from a first wireless network to a second wireless network according to embodiments herein.

As shown in FIG. 4, after time T3, the communication manager 140 uses the receiver chain hardware RC1, RC2, RC3, and RC4 to monitor and receive communications from the wireless base station 161.

In one embodiment, in response to detecting expiration of the tune-away as specified by the timing information 111, the wireless base station 161 increases a number of MIMO (Multiple Input Multiple Output) layers communicated in the downlink from the wireless base station 161 to the mobile communication device 110. For example, via communications 221 and corresponding timing information 111, the wireless base station 161 knows of the time when the temporary tune-away has been completed and the communication manager 140 is able to use all receiver chain hardware RC1, RC2, RC3, and RC4 to monitor and receive communications from the wireless base station 161 again. In such an instance, the wireless base station 161 can attempt to increase a bandwidth of data communicated to the mobile communication device 110.

Thus, embodiments herein include, via the communication manager 140, operating the mobile communication device 110 in 2 or more different modes. For example, in a first mode (or first time window before time T1), prior to receiving the input to perform the switchover of connecting the mobile communication device 110 from the first wireless base station 161 to the second wireless base station 162, the communication manager 140 of the mobile communication device 110 implements multiple chains of antenna hardware 175 in the mobile communication device to communicate with the first wireless base station 161.

In a second mode (or second time window between time T1 and time T3), subsequent to transmitting the timing information 111 and prior to expiration of a time duration specified by the timing information at time T3, the communication manager 140 of the mobile communication device 110 utilizes a first portion of the multiple Rx chains of antenna hardware 175 in the mobile communication device 110 to (continue to) communicate with the first wireless base station 161 while utilizing a second portion (freed portion) of the multiple Rx chains of antenna hardware 175 in the mobile communication device 110 to communicate with the second wireless base station 162.

Subsequent to expiration of the time duration specified by the timing information, the communication manager 140 of the mobile communication device 110 utilizes the multiple chains of antenna hardware 175 in the mobile communication device 110 to receive communications from the wireless base station 161 again.

FIGS. 5 and 6 are an example diagram illustrating example code supporting a tune-away transition according to embodiments herein.

The combination of code 510-1 and code 510-2 supports temporary tune-away as described herein.

Example Flow of Providing Tune-Away Timing Information

In one embodiment, the communication manager 140 of the mobile communication device 110 sets the contents of the communications 221 (such as UEAssistanceInformation message or other suitable message type) for delay budget report as follows:
1> if the mobile communication device 110 is configured to provide a delay budget report:
2> if the mobile communication device 110 prefers an adjustment in the connected mode DRX cycle length:
3> set delayBudgetReport to type1 according to a desired value;
2> start or restart timer T342 with the timer value set to the delayBudgetReportingProhibitTimer.

The mobile communication device 110 sets the contents of communications 221 (such as a UEAssistanceInformation message) for assistance indication:
1> if configured to provide overheating assistance indication:
2> if the mobile communication device 110 experiences internal overheating:
3> if the mobile communication device 110 prefers to temporarily reduce the number of maximum secondary component carriers:
4> include reducedMaxCCs in the OverheatingAssistance IE;
4> set reducedCCsDL to the number of maximum SCells the UE prefers to be temporarily configured in downlink;
4> set reducedCCsUL to the number of maximum SCells the UE prefers to be temporarily configured in uplink;
3> if the mobile communication device 110 prefers to temporarily reduce maximum aggregated bandwidth of FR1:
4> include reducedMaxBW-FR1 in the OverheatingAssistance IE;
4> set reducedBW-FR1-DL to the maximum aggregated bandwidth the mobile communication device 110 prefers to be temporarily configured across all downlink carriers of FR1;
4> set reducedBW-FR1-UL to the maximum aggregated bandwidth the mobile communication device 110 prefers to be temporarily configured across all uplink carriers of FR1;
3> if the UE prefers to temporarily reduce maximum aggregated bandwidth of FR2:
4> include reducedMaxBW-FR2 in the OverheatingAssistance IE;
4> set reducedBW-FR2-DL to the maximum aggregated bandwidth the mobile communication device 110 prefers to be temporarily configured across all downlink carriers of FR2;
4> set reducedBW-FR2-UL to the maximum aggregated bandwidth the mobile communication device 110 prefers to be temporarily configured across all uplink carriers of FR2;
3> if the UE prefers to temporarily reduce the number of maximum MIMO layers of each serving cell operating on FR1:
4> include reducedMaxMIMO-LayersFR1 in the OverheatingAssistance IE;
4> set reducedMIMO-LayersFR1-DL to the number of maximum MIMO layers of each serving cell operating on FR1 the mobile communication device 110 prefers to be temporarily configured in downlink;
4> set reducedMIMO-LayersFR1-UL to the number of maximum MIMO layers of each serving cell operating on FR1 the mobile communication device 110 prefers to be temporarily configured in uplink;

3> if the UE prefers to temporarily reduce the number of maximum MIMO layers of each serving cell operating on FR2:
    4> include reducedMaxMIMO-LayersFR2 in the OverheatingAssistance IE;
    4> set reducedMIMO-LayersFR2-DL to the number of maximum MIMO layers of each serving cell operating on FR2 the mobile communication device 110 prefers to be temporarily configured in downlink;
    4> set reducedMIMO-LayersFR2-UL to the number of maximum MIMO layers of each serving cell operating on FR2 the mobile communication device 110 prefers to be temporarily configured in uplink;
3> if the mobile communication device 110 is detected as supporting multiple SIMs such as SIM 171 and SIM 172 (for example, the mobile communication device 110 is Multi-SIM capable), and the mobile communication device 110 needs to tune-away from present wireless network 121 (PLMN) to perform Multi-SIM operation on wireless network 122 (a different PLMN), then:
    4> include timing information 111 timing information TI1 (such as multiSIMTuneAwayTimer) in the communications 221 (such as MultiSIMAssistance IE);
    4> include timing information TI2 (such as miniSlotMultiplier) in the communications 111 (such as MultiSIMAssistance IE);
3> start timer T345 with the timer value set to overheatingIndicationProhibitTimer;
2> else (if the mobile communication device 110 no longer experiences an overheating condition):
    3> do not include reducedMaxCCs, reducedMaxBW-FR1, reducedMaxBW-FR2, reducedMaxMIMO-LayersFR1 and reducedMaxMIMO-LayersFR2 in OverheatingAssistance IE;
    3> do not include timing information TI1 (such as multiSIMTuneAwayTimer), and timing information TI2 (such as miniSlotMultiplier) in communications 221 (such as MultiSIMAssistance IE);
    3> start timer T345 with the timer value set to the overheatingIndicationProhibitTimer.

In one embodiment, the timing information 111 (such as specifying a tune-away duration) for use by Multi-SIM mobile communication device 110 informs the communication manager 141 (such as gNB or other suitable entity) of the duration for which its one or more transmit chains and or receive chains are to tune-away from present PLMN (such as wireless network 121) to perform Multi-SIM operation on a different PLMN (such as wireless network 122). In one embodiment, the time value (such as a data field specifying a value) of the timing information TI1 is in microseconds.

By way of non-limiting example embodiment, the setting of the time duration of how long it will take to the mobile communication device 110 to complete tune-away is based on a combination of the timing information TI1 (time value such as a multiSIMTuneAwayTimer) and timing information TI2 (a respective multiplier value such as miniSlotMultiplier) in the timing information 111 of communications 221.

As an illustrative example, a value of "us8dot33" in timing information TI1 together with miniSlotMultiplier of a setting of 1 in timing information TI2 means that the prohibit timer is set to a duration of (8.33*1=) 8.33 micro seconds; the value "us8dot33" together with a miniSlotMultiplier of 2 means this prohibit timer is set to 8.33*2=16.66 micro seconds, and so on.

Thus, in one embodiment, the multiplier value (such as minislotMultiplier) is an integer value used in conjunction with the time (such as multiSIMTuneAwayTimer) to determine a respective time duration.

Figure 7:
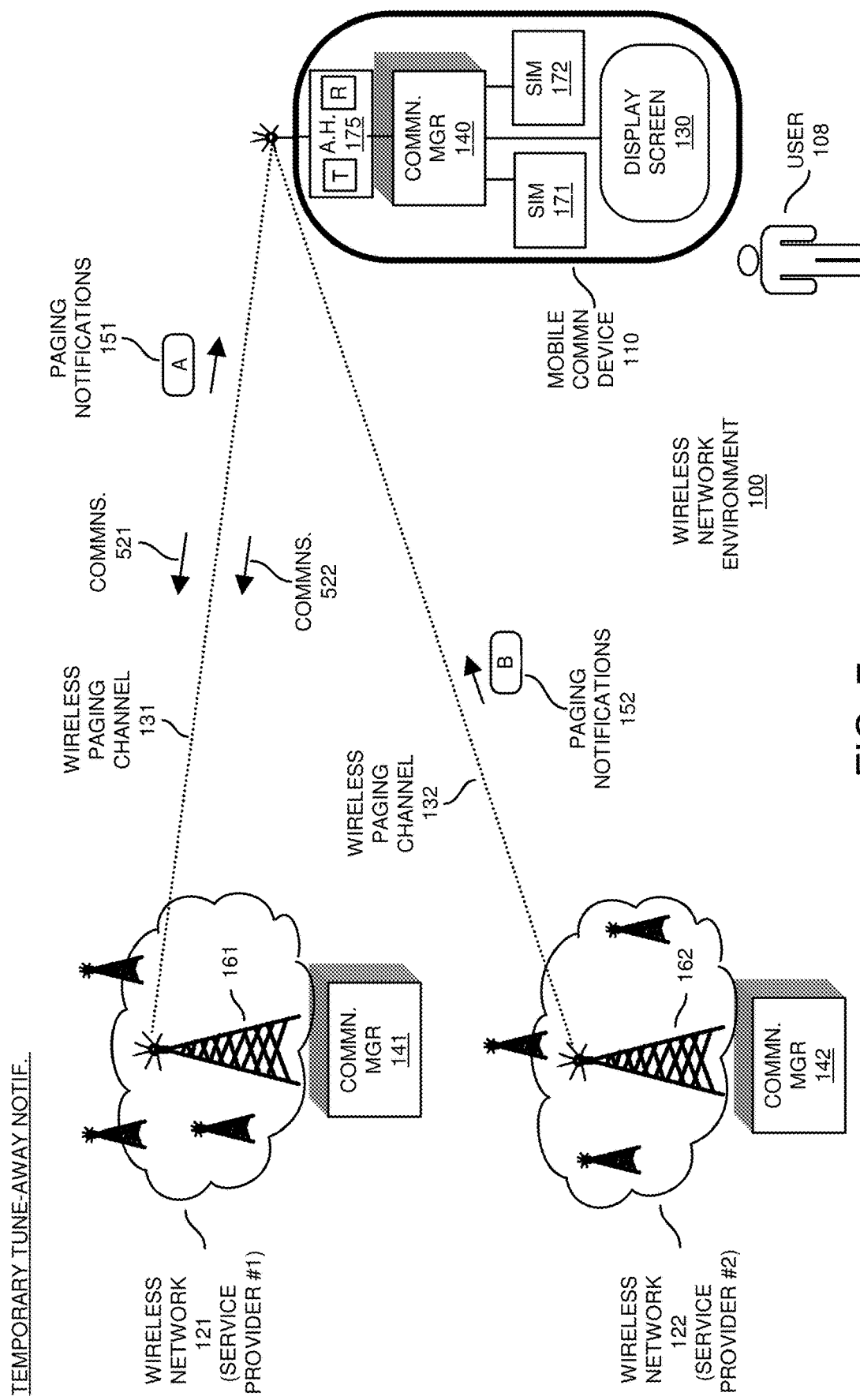
FIG. 7 is an example diagram illustrating temporary tune-away of mobile communication device from a first wireless network to a second wireless network according to embodiments herein.

FIG. 7 is an example diagram illustrating a wireless network environment implementing wireless paging channels and corresponding techniques according to embodiments herein.

As shown in FIG. 7, wireless network environment 100 includes a first wireless network 121, a second wireless network 122, and mobile communication device 110.

Via wireless paging channel 131, the wireless network 121 communicates paging notifications 151 to one or more mobile communication devices in the wireless network environment 100.

Via wireless paging channel 132, the wireless network 122 communicates paging notifications 152 to one or more mobile communication devices in the wireless network environment 100.

In one embodiment, user 108 subscribes to use of both wireless network 121 and wireless network 122. For example, assume that the mobile communication device 110 is assigned a first SIM 171 (Subscriber Identity Module) provided by a first wireless network service provider to use the first wireless network 121 and corresponding wireless connectivity provided by wireless network 121. In such an instance, the first paging notifications 151 communicated over wireless paging channel 131 (and one or more respective allocated paging occasions) are associated with a first SIM 171 assigned to the mobile communication device 110.

The mobile communication device 110 is assigned a second SIM (Subscriber Identity Module) 172 via a second wireless network service provider to use the second wireless network 122. The second paging notifications 152 communicated over the wireless paging channel 132 (and one or more respective allocated paging occasions) are associated with the second SIM 172 assigned to the mobile communication device 110.

Depending on the embodiment, note that the first SIM 171 and the second SIM 172 are provided by the same or different wireless network service providers.

In accordance with further example embodiments, the first wireless network 121 supports a first type of wireless communications such as voice or telephony communications. The second wireless network 122 supports a second type of wireless communications such as data communications (such as supporting web page retrieval, email retrieval, video content delivery, etc.).

In general, a SIM is an integrated circuit that securely stores information such as the international mobile subscriber identity (IMSI). In certain instances, it is a memory chip that enables a respective user to receive and establish phone calls via the mobile communication device 110. The identity information provides a way to send communications to the mobile communication device 110.

In this example embodiment, assume that the wireless network 121 is operated by a first service provider (wireless network service provider #1) and includes any number of wireless base stations including wireless base station 161. Wireless base station 161 includes communication manager 141 (such as a gNode B or other suitable entity) that receives paging notifications directed to the mobile communication device 110 (and potentially other mobile communication devices) and communicates such paging notifications 151 in respective paging occasions over the wireless paging channel 131 in the wireless network environment 100.

Wireless network 122 operated by a second service provider includes any number of wireless base stations including wireless base station 162. Wireless base station 162 includes communication manager 142 (such as a gNode B or other suitable entity) and receives paging notifications directed to the mobile communication device 110 (and potentially other mobile communication devices) and communicates such paging notifications 152 in respective paging occasions over the wireless paging channel 132 in the wireless network environment 100.

Note that the mobile communication device 110 supports individual and/or simultaneous use of the first wireless network 121 and the second wireless network 122. Communication of the one or more paging notifications 151 over wireless paging channel 131 informs the mobile communication device 110 of any suitable event (alert, message, etc.) such as that: i) the wireless network 121 has something available for the mobile communication device 110, ii) the mobile communication device 110 should perform a respective function, etc.

Thus, via the wireless paging channel 131, the mobile communication device 110 in the wireless network environment 100 receives first paging notifications 151 directed to the mobile communication device 110 from a first wireless base station 161 (and communication manager 141) such as operated by a first wireless network service provider (service provider 1).

The mobile communication device also receives second paging notifications 152 directed to the mobile communication device 110 from the second wireless base station 162 (and communication manager 142) such as operated by a second wireless network service provider (service provider #2).

As further shown in FIG. 7, the mobile communication device 110 (user equipment) receives paging notifications 151 from the wireless base station 161 (communication manager 141 such as a gNodeB) in the first wireless network 121. In response to receiving input while the mobile communication device 110 is wirelessly connected to the first wireless network 121, the mobile communication device 110 generates a switchover notification indicating a planned temporary switchover of the mobile communication device 110 to the second wireless network 121.

The mobile communication device 110 then transmits the switchover (tune-away) notification in communications 521 to the communication manager 141 of wireless base station 161 in the first wireless network 121. The switchover notification informs the first wireless network 121 of the planned temporary switchover (full or partial tune-away) of the mobile communication device 110 to the second wireless network 122.

In one embodiment, the communications 521 (including switchover notification) communicated from the mobile communication device 110 to the communication manager 141 of wireless base station 161 includes an acknowledgement message communicated to the first wireless network 121. The acknowledgement message notifies the wireless network 121 that the mobile communication device 110 received a paging notification communicated to the mobile communication device 110 over the wireless paging channel 131.

As a more specific example, assume that the mobile communication device receives a paging notification from the first wireless network 121 over the wireless paging channel 131. The mobile communication device produces an acknowledgement message acknowledging receipt of the paging notification by the mobile communication device 110 from the first network 121. The mobile communication device 110 then communicates the acknowledgement message from the mobile communication device 110 in the communications 521 to communication manager 141 of base station 161 in the first wireless network 121. Thus, the wireless base station 121 receives an acknowledgement of the communication manager 140 receiving a respective paging notification.

As previously discussed, in one nonlimiting example embodiment, the communications 521 include an acknowledgement message from the mobile communication device 110 and switchover notification indicating the temporary planned switchover of the mobile communication device 110 from the first wireless network 121 to the second wireless network 122.

In one embodiment, the physical switchover (such as temporary tune-away) includes the mobile communication device 110 using its corresponding antenna hardware 175 to communicate (such as transmit and or receive wireless signals) from the second wireless network 122. Subsequent to the temporary switchover duration as specified by the communications 521, the mobile communication device 110 switches back to using its respective antenna hardware 175 to communicate with or monitor communications such as paging notifications from the first wireless network 121 again.

Additional details associated with tune-away are further discussed in the following figures.

Figure 8:
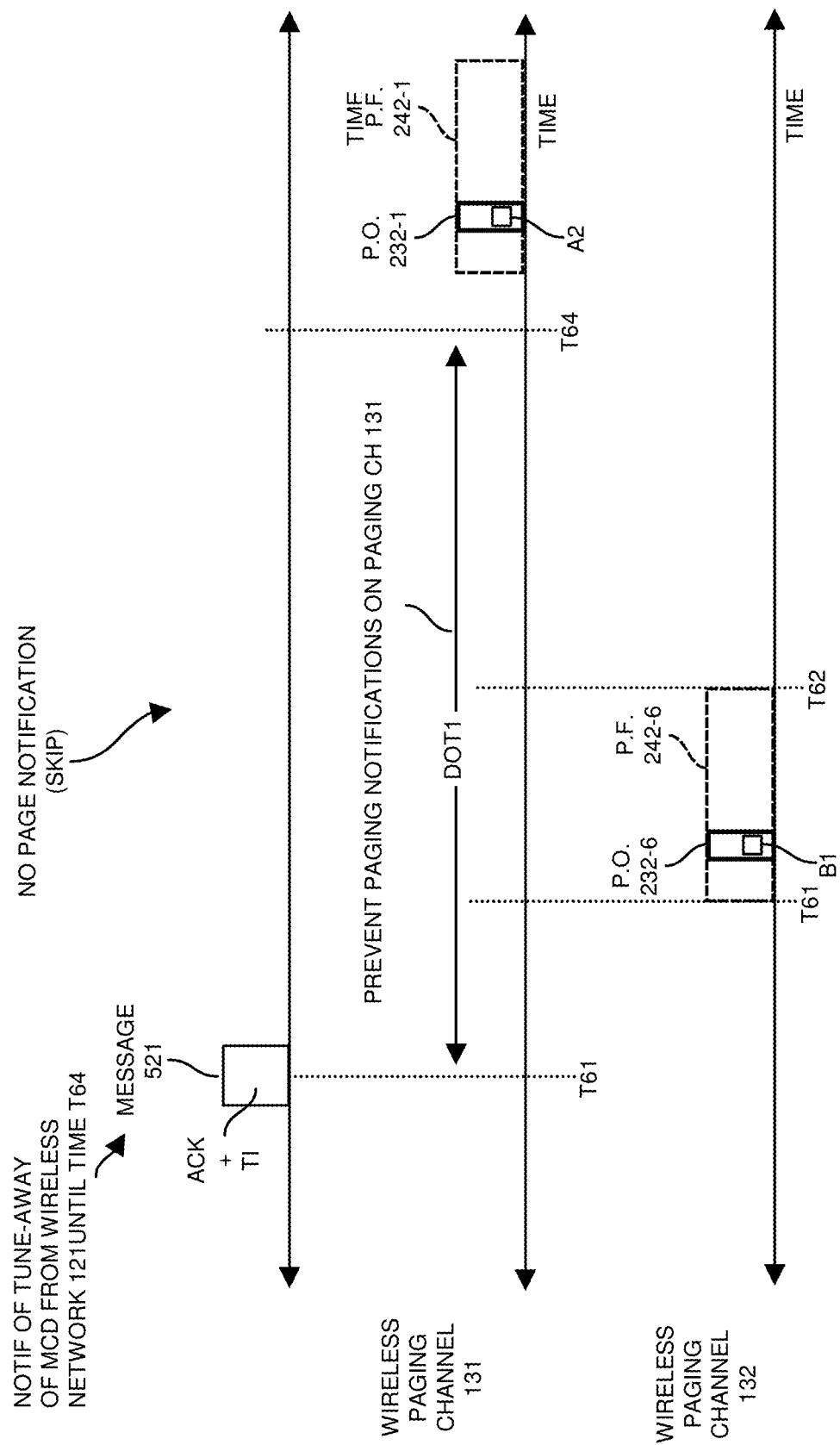
FIG. 8 is an example timing diagram illustrating timing associated with an example tune-away according to embodiments herein.

FIG. 8 is an example timing diagram illustrating timing associated with multiple wireless paging channels according to embodiments herein.

In accordance with further example embodiments, the planned switchover notification in communications 521 from the mobile communication device 110 indicates a duration of time DOT1 (or start time T61 and end time T62 of the temporary tune-away) in which the mobile communication device 110 is scheduled to be unavailable to monitor for receipt of paging notifications 131 from the first wireless network 121. In such an instance, in one embodiment, the first wireless network 121 has no expectation of the mobile communication device 110 receiving paging notifications during the switchover duration DOT1 (such as between time T61 and time T64) as specified by communications 521 and corresponding switchover notification.

During all or a portion of the duration DOT1, the mobile communication manager 140 of the mobile communication device 110 switches all or a portion of the antenna hardware 175 to monitor wireless paging channel 132 instead of wireless paging channel 131. During the switchover time, in response to the tune-away notification, the wireless network 121 prevents communication of paging notifications to the mobile communication device 110 between time T61 and time T64.

However, after the time duration DOT1, the first wireless network 121 has an expectation or assumes that the mobile communication device 110 will be able to receive paging notifications from the first wireless network 121.

During the tune-away between time T61 and time T62, the communication manager 140 of the mobile communication device 110 monitors the wireless paging channel 132 for paging notifications in its assigned paging occasion (in wireless network 122) such as paging occasion 232-6 of paging frame 242-6. In such an instance, the mobile communication device 110 receives paging notification B1 from the wireless base station 162.

As further shown in FIG. 8, after tune-away end time T64 (expiration of the duration of time DOT1), assume that the wireless network 121 has a paging notification A2 that must be sent to the mobile communication device 110. After expiration of the duration DOT1, the wireless network 121 communicates the respective paging notification A2 in the paging occasion 232-1 of paging frame 242-1 allocated to the mobile communication device 110 over the wireless paging channel 131. At or about time T64, the communication manager 140 controls the antenna hardware 175 to monitor the wireless paging channel 131 again. In such an instance, the mobile communication device 110 receives the paging notification A2 from the wireless network 121.

Thus, the switchover of the antenna hardware 175 associated with mobile communication device 110 includes a temporary tune-away of wireless antenna hardware 175 (such as one or more receiver chains associated with antenna hardware 175) in communication with the first wireless network 121 to the second wireless network 122. The temporary tune-away of the wireless antenna hardware includes subsequent to the temporary tune-away (duration of time DOT1), utilizing the wireless antenna hardware 175 (such as one or more receiver chains) to monitor the paging notification channel 131 of the first wireless network 121 again.

Thus, embodiments herein include a means in which the mobile communication device 110 (user equipment) notifies wireless network 121 (Network A) of its switch away from wireless network 121 (Network A).

More specifically, in one aspect, the INACTIVE MUSIM UE (mobile communication device 110) sends a paging ACK message for paging notifications received on wireless network 121 together with the tune-away message that indicates the duration (DOT1) of the switch away. The wireless network 121 assumes the mobile communication device 110 (user equipment) will tune back to wireless network 121 after the indicated duration or a specified point in time. For example, the communications can indicate a start time (T61) of the planned switchover tune-away as well as an end time (T64) of the panned tune-away.

As mentioned, wireless network 121 terminates further POs (Paging Occasions) and/or future PFs (Paging Frames) addressed to that mobile communication device 110 for the duration of the tuning away.

In one embodiment, note that the paging ACK in communications 521 is a higher-layer message from the mobile communication device 110.

In a more specific example embodiment, the paging ACK (acknowledgement) in communications 521 informs network 121 (network A) that the mobile communication device intends to transition to CONNECTED mode on network 121 after the conclusion of the switching duration (such as at or about time T64) on wireless network 122 (network B).

In one embodiment, this mechanism ties the notification to the paging cycle on network A.

As further discussed below, a single-Tx MUSIM mobile communication device 110 in CONNECTED mode on wireless network 121 may need to override or update the switching duration it (mobile communication device 110) previously indicated to wireless network 121 after the user equipment (mobile communication device 110) has switched away to wireless network 122. For example, in one embodiment, the paging search space on wireless network 122 may be used for scheduling unicast data.

Figure 9:
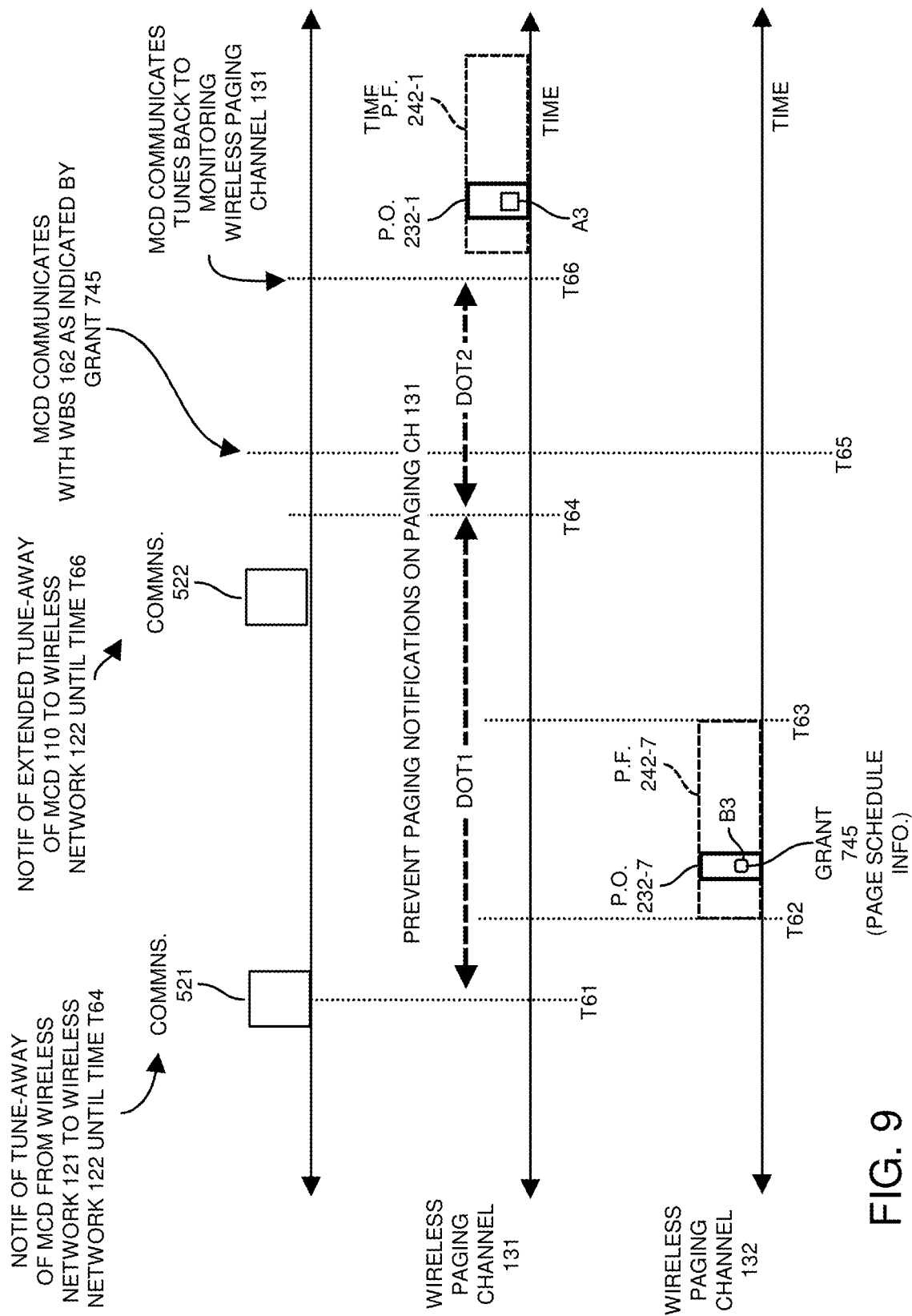
FIG. 9 is an example timing diagram illustrating timing associated with an example tune-away according to embodiments herein.

FIG. 9 is an example timing diagram illustrating timing associated with multiple wireless paging channels according to embodiments herein.

Assume in this example embodiment that, while monitoring a wireless paging channel 132 of the second wireless network 1222 during the planned temporary switchover between time T61 and time T64, the mobile communication device 110 uses the antenna hardware 175 to monitor the wireless paging channel 132 resulting in detection of a paging notification B3 (in paging occasion 232-7 of paging frame 242-7) directed to the mobile communication device 110 from the wireless base station 162 of the second wireless network 122.

Such a paging notification B3 from the second wireless network 122 (and corresponding wireless paging channel 132) may indicate a grant of wireless resources associated with the second wireless network 122 to the mobile communication device 110.

In one embodiment, this paging notification B3 from the second wireless network 122 prevents (delays) the mobile communication device 110 from being able to switch back the antenna hardware 175 to monitoring the wireless paging channel 131 again within the original amount of time (such as DOT1 or end time T64) as previously indicated by the mobile communication device 110 in communications 521.

In other words, the paging notification B3 received by the mobile communication device 110 and use of wireless resources of the wireless network 122 prevents (delays) the mobile communication device 110 from switching back the antenna hardware 175 to monitoring the wireless paging channel 131 of the first wireless network 121 again. In such an instance, in response to receiving the communications 522 (notification of delay to time T66), the first wireless network 121 terminates communication of paging notifications to the mobile communication device 110 over its wireless paging channel 131 during the extended planned temporary switchover up until the time T66 or extra duration of time as specified by the mobile communication device 110 in communications 522.

In such an instance, in one embodiment, in response to detecting the paging notification B3 from the second wireless network 122, the mobile communication device 110 communicates an updated planned switchover notification (communications 522) over a wireless communication link to the first wireless network 121. The updated planned switchover notification in communications 522 informs the first wireless network 121 that an initial planned duration (DOT1 or end time of T64) of the temporary switchover of the mobile communication device 110 to the second wireless network 121 has been extended or delayed. In one embodiment, the updated planned switchover message in communications 522, via an end time or extra time duration DOT2, indicates how long the mobile communication device 110 will be further delayed (prevented) from monitoring the wireless paging channel 131 of the first wireless network 121 again.

Thus, based on receiving notification in communications 522 that the mobile communication device 110 will be delayed, the first wireless network 121 delays sending paging notifications on its corresponding wireless paging channel 131 until an extended time T66 after which time it is known that the mobile communication device 110 will be monitoring the wireless paging channel 131 of the first wireless network 121 again.

More specifically, in such an embodiment, a mobile communication device 110 (such as a MUSIM UE) in CONNECTED mode on wireless network 121 may need to override or update the switching duration it previously indicated to wireless network 121 after it has switched away to wireless network 122. For example, the paging search space on wireless network 122 may be used for scheduling unicast data to that mobile communication device 110, as is supported in Rel-15. Then the mobile communication device 110 may choose to stay longer on wireless network 122 than the original switching duration indicated to wireless network 121 is no longer valid.

If wireless network 121 uses the original switching value and sends control or data to the mobile communication device 110 even though it has not yet switched back, this is an inefficient use of network resources.

Figure 10:
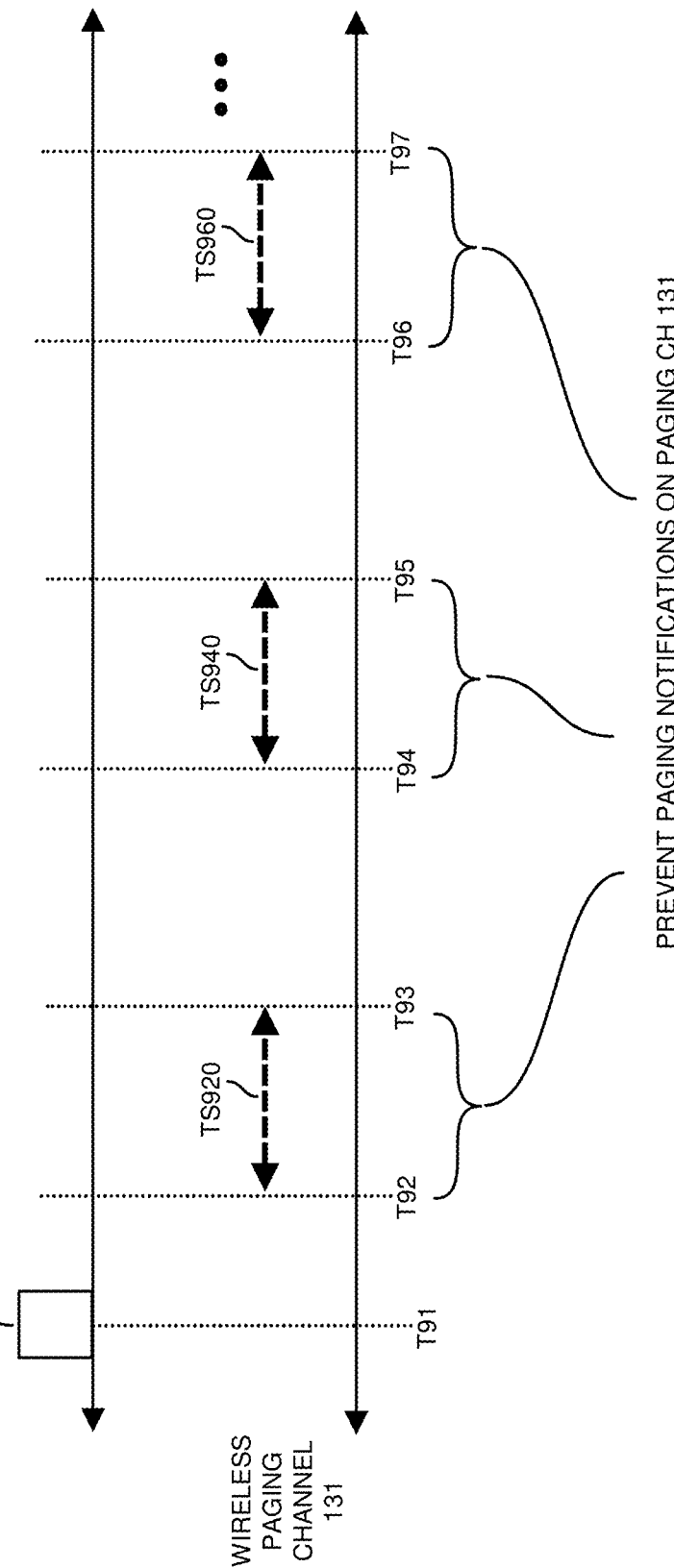
FIG. 10 is an example timing diagram illustrating timing associated with an example tune-away in multiple time slots according to embodiments herein.

FIG. 10 is an example timing diagram illustrating timing associated with an example tune-away of a mobile communication device to a different wireless network in multiple time slots according to embodiments herein.

In accordance with further example embodiments, the communication manager 140 of the mobile communication device 110 generates communications 521 to indicate multiple timeslots in which the mobile communication device 110 is scheduled to tune-away to all or a portion of the receiver chains associated with antenna hardware 175 to monitor and receive paging notifications from wireless network 122 over wireless paging channel 132 (or one or more other wireless paging channels associated multiple other wireless networks).

For example, assume in this example embodiment that the communication manager 140 produces the communications 521 to indicate that the mobile communication device 110 will tune-away from wireless network 121 during time slot TS920, TS940, TS960, and so on.

The tune-away time slots TS920, TS940, TS960, etc., can be specified in any manner. For example, the communication manager 140 can be configured to generate the communications 521 to indicate: i) time slot TS920 via a start time of TS92 and a stop time of TS93; ii) time slot TS940 via a start time of TS93 and a stop time of TS94; iii) time slot TS960 via a start time of TS96 and a stop time of TS97; and so on.

During time slot TS920, TS940, TS960, etc., the mobile communication device 110 monitors wireless paging channel 132 for respective paging notifications. In one embodiment, the time slots specified by the communications 520 coincide with at least the paging occasions assigned to the mobile communication device 110 (associated with SIM 172) on the wireless paging channel 132.

In accordance with further example embodiments, the mobile communication device 110 is configured to define the time slots based on period or frequency information of repetition as well as time slot width information defining time slots TS920, TS940, TS960, etc.

Based on received time slot information in FIG. 10, the wireless network 121 transmits any paging notifications associated with the wireless network 121 in times between T91 and T92, T93 and T94, and T95 and T96, etc.

Figure 11:
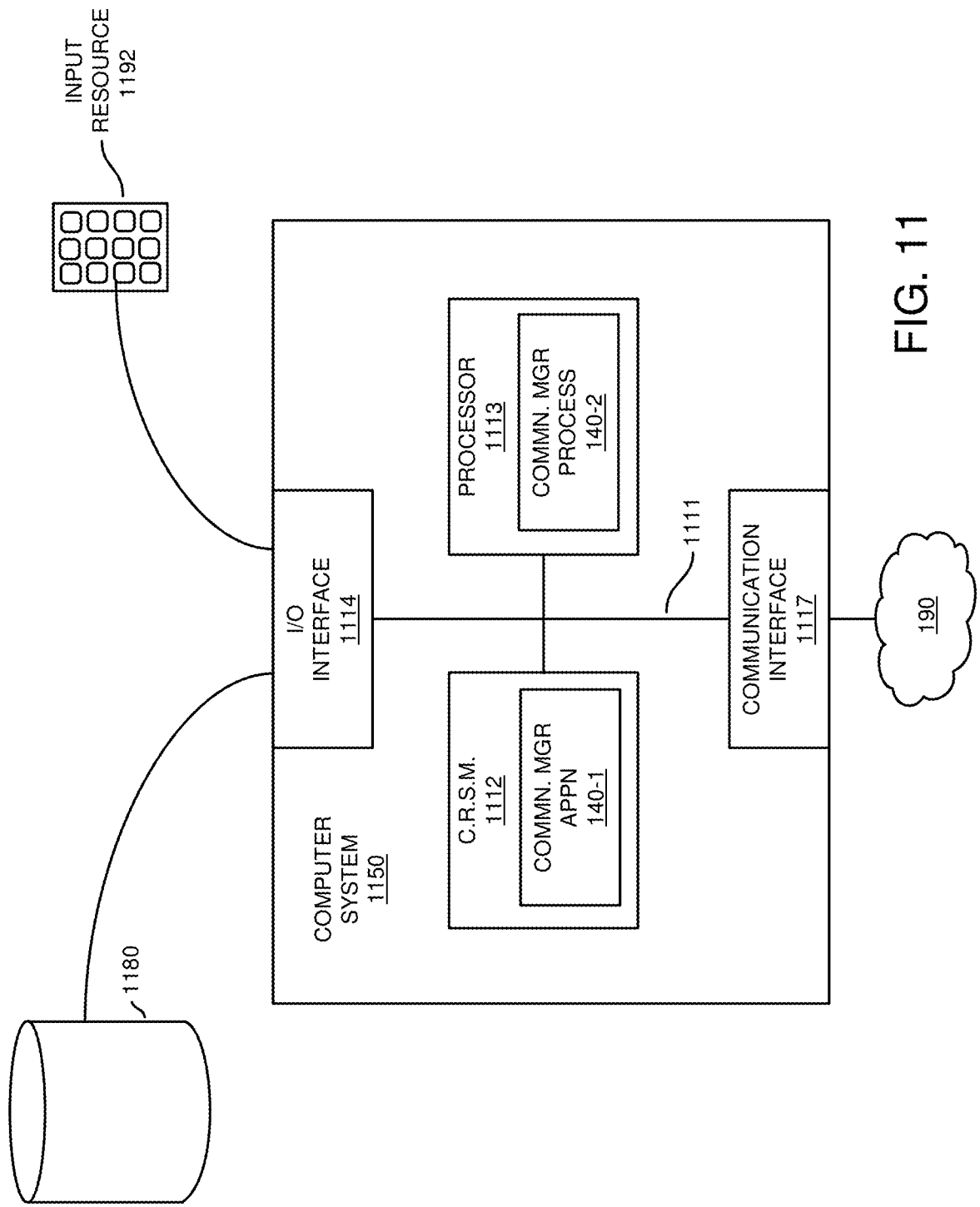
FIG. 11 is an example diagram illustrating example computer hardware and software operable to execute one or more operations according to embodiments herein.

FIG. 11 is an example block diagram of a computer system for implementing any of the operations as previously discussed according to embodiments herein.

Any of the resources (such as communication manager 140, communication manager 141, communication manager 142, mobile communication device 110, wireless base station 161, wireless base station 162, etc.) as discussed herein can be configured to include computer processor hardware and/or corresponding executable instructions to carry out the different operations as discussed herein.

As shown, computer system 1050 of the present example includes interconnect 1011 coupling computer readable storage media 1012 such as a non-transitory type of media (which can be any suitable type of hardware storage medium in which digital information can be stored and or retrieved), a processor 1013 (computer processor hardware), I/O interface 1014, and a communications interface 1017.

I/O interface(s) 1014 supports connectivity to repository 1080 and input resource 1092.

Computer readable storage medium 1012 can be any hardware storage device such as memory, optical storage, hard drive, floppy disk, etc. In one embodiment, the computer readable storage medium 1012 stores instructions and/or data.

As shown, computer readable storage media 1012 can be encoded with communication manager application 140-1 (e.g., including instructions) in a respective wireless station to carry out any of the operations as discussed herein.

During operation of one embodiment, processor 1013 accesses computer readable storage media 1012 via the use of interconnect 1011 in order to launch, run, execute, interpret or otherwise perform the instructions in communication manager application 140-1 stored on computer readable storage medium 1012. Execution of the communication manager application 140-1 produces communication manager process 140-2 to carry out any of the operations and/or processes as discussed herein.

Those skilled in the art will understand that the computer system 1050 can include other processes and/or software and hardware components, such as an operating system that controls allocation and use of hardware resources to execute communication manager application 140-1.

In accordance with different embodiments, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 1050 may reside at any location or can be included in any suitable resource in any network environment to implement functionality as discussed herein.

Functionality supported by the different resources will now be discussed via flowcharts in FIGS. 12 and 13. Note that the steps in the flowcharts below can be executed in any suitable order.

Figure 12:
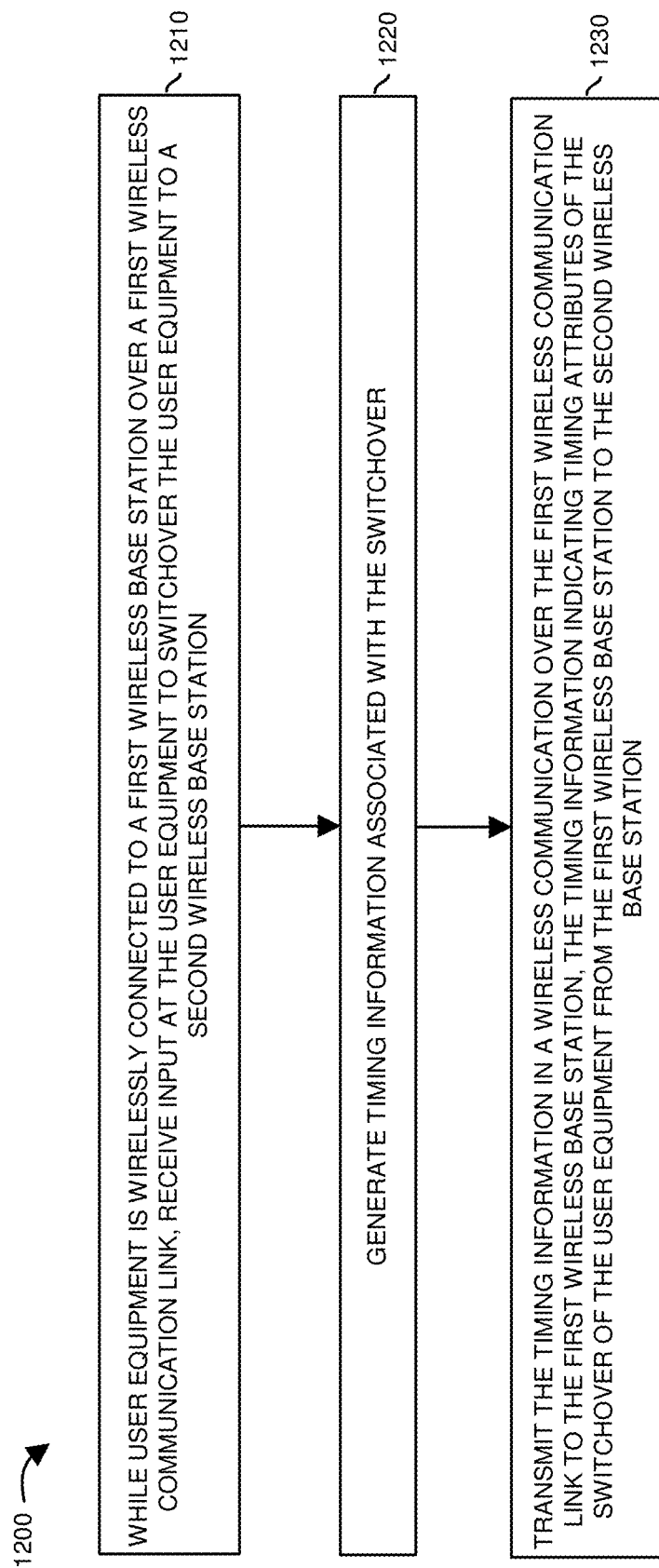
FIG. 12 is an example diagram illustrating a method according to embodiments herein.

FIG. 12 is a flowchart 1200 illustrating an example method according to embodiments herein. Note that there will be some overlap with respect to concepts as discussed above.

In processing operation 1210, while a mobile communication device 110 is wirelessly connected to a first wireless base station 161 over a first wireless communication link, the communication manager 140 receives input to switchover the mobile communication device 110 to a second wireless base station 162.

In processing operation 1220, the communication manager 140 of the mobile communication device 110 generates timing information 111 associated with the switchover.

In processing operation 1230, the mobile communication device 110 transmits the timing information 111 in wireless communications 221 over the first wireless communication link to the first wireless base station 161. The timing information 111 indicates timing attributes of the switchover of the mobile communication device 110 from the first wireless base station 161 (first wireless network 121) to the second wireless base station 162 (wireless network 122).

Figure 13:
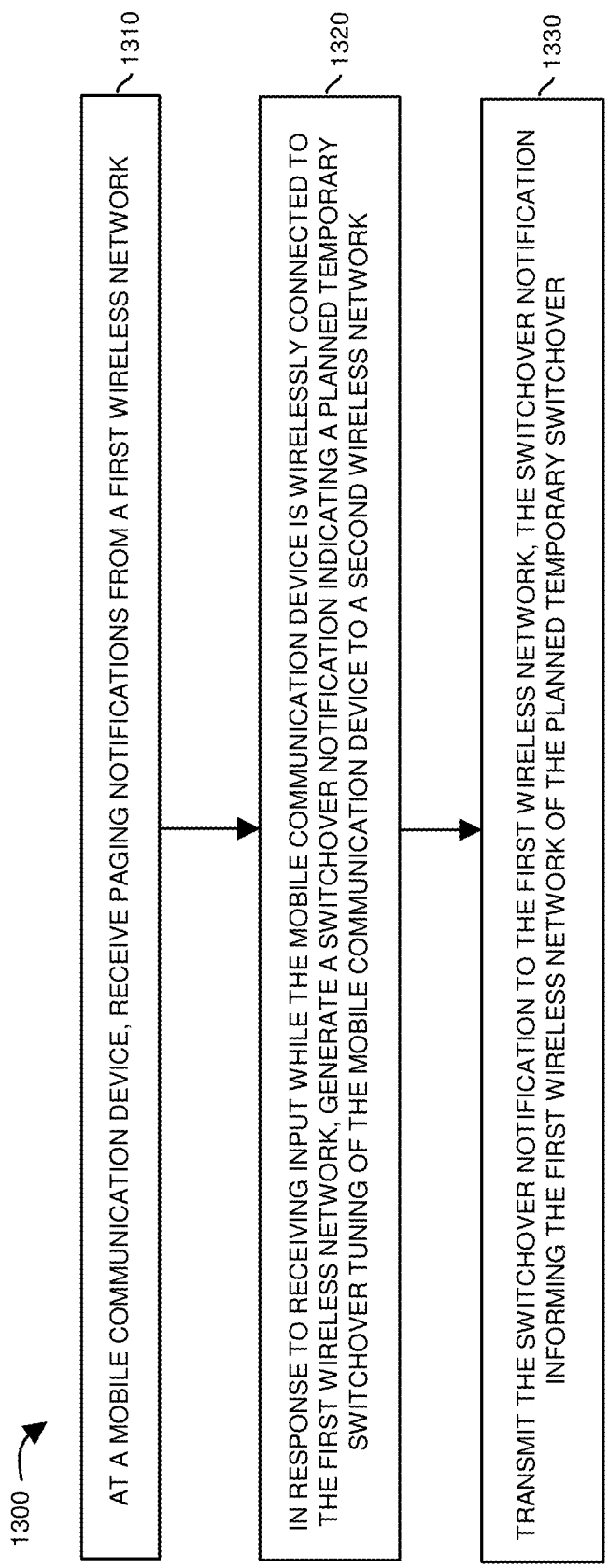
FIG. 13 is an example diagram illustrating a method according to embodiments herein.

FIG. 13 is an example diagram illustrating a method according to embodiments herein. Note that there will be some overlap with respect to concepts as discussed above.

In processing operation 1310 of flowchart 1300, the mobile communication device 110 receives one or more paging notifications 151 from the wireless base station 161 in the first wireless network 121 operated by a first service provider.

In processing operation 1320, in response to receiving input while the mobile communication device 110 is wirelessly connected to the first wireless network 121, the mobile communication device 110 generates a switchover notification (such as message 521 or message 522) indicating a planned temporary switchover (tune-away) of the mobile communication device 110 from the first wireless network 121 to the second wireless network 122.

In processing operation 1330, the mobile communication device 110 transmits the switchover notification (via message 521 or message 522) to the first wireless network 121; the switchover notification informs the first wireless network 121 of the planned temporary switchover tuning (tune-away) associated with the mobile communication device 110 to the second wireless network 122.

Note again that techniques herein are well suited to facilitate use of a shared wireless channel amongst different types of wireless stations. However, it should be noted that embodiments herein are not limited to use in such applications and that the techniques discussed herein are well suited for other applications as well. Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
   at user equipment, receiving paging notifications from a first wireless network;
   receiving input while the user equipment is wirelessly connected to the first wireless network, the input indicating to switchover the user equipment from the first wireless network to a second wireless network;
   in response to receiving the input, generating a switchover notification indicating a planned temporary switchover of the user equipment to the second wireless network, the planned temporary switchover being a partial tune-away in which: i) first receiver antenna hardware of the user equipment is implemented to receive wireless communications from the first wireless network, and ii) second receiver antenna hardware of the user equipment is implemented to receive wireless communications from the second wireless network; and
   transmitting the switchover notification from the user equipment to the first wireless network, the switchover notification informing the first wireless network of the planned temporary switchover.

2. The method as in claim 1 further comprising:
   at the user equipment, receiving a first paging notification from the first wireless network;
   producing an acknowledgement message, the acknowledgement message acknowledging receipt of the first paging notification by the user equipment from the first network; and
   communicating the acknowledgement message from the user equipment to the first wireless network, the acknowledgement message including the switchover notification indicating the temporary planned switchover.

3. The method as in claim 1, wherein the switchover notification indicates a duration of time in which the user equipment is scheduled to be unavailable to monitor for receipt of paging notifications from the first wireless network.

4. The method as in claim 1 further comprising:
   while monitoring a first paging notification channel of the second wireless network during the planned temporary switchover, at the user equipment, detecting a paging notification directed to the user equipment.

5. The method as in claim 4, wherein the paging notification indicates a grant of wireless resources associated with the second wireless network to the user equipment.

6. The method as in claim 4 further comprising:
   in response to detecting the paging notification from the second wireless network, communicating an updated planned switchover notification over a first wireless communication link from the user equipment to the first wireless network, the updated planned switchover notification informing the first wireless network that an initial planned duration of the planned temporary switchover of the user equipment to the second wireless network has been extended.

7. The method as in claim 1, wherein the planned switchover includes a temporary tune-away of the second receiver antenna hardware from the first wireless network to the second wireless network, the method further comprising:
subsequent to the planned temporary switchover, utilizing the second receiver antenna hardware to monitor a paging notification channel of the first wireless network again.

8. The method as in claim 1, wherein a first SIM (Subscriber Identity Module) assigned to the user equipment supports connectivity of the user equipment to the first wireless network which is operated by a first wireless network service provider; and
wherein a second SIM (Subscriber Identity Module) assigned to the user equipment supports connectivity of the user equipment to the second wireless network which is operated by a second wireless network service provider.

9. The method as in claim 1, wherein the first wireless network is operative to terminate communication of paging notifications to the user equipment during the planned temporary switchover.

10. The method as in claim 1, wherein the planned temporary switchover notification indicates a duration of time that the user equipment is scheduled to tune the second receiver antenna hardware of the user equipment to the second wireless network instead of the first wireless network, the method further comprising:
at the user equipment, tuning the second receiver antenna hardware of the user equipment back to the first wireless network subsequent to expiration of the duration of time.

11. The method as in claim 1 further comprising:
generating a communication indicating an update to a switchover duration previously indicated by the user equipment to the first wireless network.

12. The method as in claim 11 further comprising:
transmitting the communication indicating the update to the switchover duration to the first wireless network after the user equipment has switched over to the second wireless network.

13. The method as in claim 1 further comprising:
generating timing information associated with the planned temporary switchover; and
transmitting the timing information from the user equipment to the first wireless network, the timing information indicating a time duration of the planned temporary switchover.

14. The method as in claim 13, wherein time duration is based on a duration of time needed to establish connectivity between the user equipment and the second wireless network.

15. The method as in claim 1 further comprising:
producing the switchover notification to include timing information, the timing information including a first portion and second portion, the first portion specifying a time value, the second portion specifying a multiplier value applicable to the time value, a combination of the time value and multiplier value indicating a time duration of the planned temporary switchover.

16. The method as in claim 15 further comprising:
transmitting the timing information in a UE Assistance Information message.

17. The method as in claim 1, wherein the first receiver antenna hardware includes a first chain of antennas; and
wherein the second receiver antenna hardware includes a second chain of antennas.

18. The method as in claim 1, wherein the first receiver antenna hardware is operative to receive first paging notifications from the first wireless network during the planned temporary switchover; and
wherein the second receiver antenna hardware is operative to receive second paging notifications from the second wireless network during the planned temporary switchover.

19. The method as in claim 1 further comprising:
subsequent to the planned temporary switchover, utilizing the first antenna hardware and the second antenna hardware to support communications between user equipment and the first wireless network.

20. The method as in claim 1, wherein the switchover notification indicates a start time and end time of the planned temporary switchover.

21. The method as in claim 20 further comprising:
communicating an update message to the first wireless network, the update message indicating a delay of the end time of the planned temporary switchover.

22. The method as in claim 21, wherein the end time of the planned temporary switchover is delayed in response to the second wireless network granting the user equipment use of wireless resources.

23. A system comprising:
user equipment operative to:
receive paging notifications from a first wireless network;
receive input while the user equipment is wirelessly connected to the first wireless network, the input indicating to switchover the user equipment from the first wireless network to a second wireless network;
in response to receiving the input, generate a switchover notification indicating a planned temporary switchover of the user equipment to a second wireless network, the planned temporary switchover being a partial tune-away in which: i) first receiver antenna hardware of the user equipment is implemented to receive wireless communications from the first wireless network, and ii) second receiver antenna hardware of the user equipment is implemented to receive wireless communications from the second wireless network; and
transmit the switchover notification to the first wireless network, the switchover notification informing the first wireless network of the planned temporary switchover.

24. The system as in claim 23, wherein the user equipment is further operative to:
receive a first paging notification from the first wireless network;
produce an acknowledgement message, the acknowledgement message acknowledging receipt of the first paging notification by the user equipment from the first wireless network; and
communicate the acknowledgement message from the user equipment to the first wireless network, the acknowledgement message including the switchover notification indicating the temporary planned switchover.

25. The system as in claim 23, wherein the switchover notification indicates a duration of time in which the user equipment is scheduled to be unavailable to monitor for receipt of paging notifications from the first wireless network.

26. The system as in claim 23, wherein the user equipment is further operative to:
while monitoring a paging notification channel of the second wireless network during the planned temporary switchover, detect a paging notification directed to the user equipment from the second wireless network.

27. The system as in claim 26, wherein the paging notification indicates a grant of wireless resources associated with the second wireless network to the user equipment.

28. The system as in claim 26, wherein the user equipment is further operative to:
in response to detecting the paging notification from the second wireless network, communicate an updated planned switchover notification over a first wireless communication link to the first wireless network, the updated planned switchover notification informing the first wireless network that an initial planned duration of the planned temporary switchover of the user equipment to the second wireless network has been extended.

29. The system as in claim 23, wherein implementation of the planned temporary switchover includes a temporary tune-away of the second receiver antenna hardware from the first wireless network to the second wireless network, the user equipment further operative to:
subsequent to the planned temporary tune-away, utilize the second receiver antenna hardware to monitor a paging notification channel of the first wireless network again.

30. The system as in claim 23, wherein a first SIM (Subscriber Identity Module) assigned to the user equipment supports connectivity of the user equipment to the first wireless network which is operated by a first wireless network service provider; and
wherein a second SIM (Subscriber Identity Module) assigned to the user equipment supports connectivity of the user equipment to the second wireless network which is operated by a second wireless network service provider.

31. The system as in claim 23, wherein the first wireless network is operative to terminate communication of paging notifications to the user equipment during the planned temporary switchover.

32. The system as in claim 23, wherein the planned temporary switchover notification indicates a duration of time that the user equipment is scheduled to tune the second receiver antenna hardware to the second wireless network instead of the first wireless network, the user equipment further operative to: tune the second receiver antenna hardware back to the first wireless network subsequent to expiration of the duration of time.

33. Computer-readable storage hardware having instructions stored thereon, the instructions, when carried out by computer processor hardware, cause the computer processor hardware to:
at user equipment, receive paging notifications from a first wireless network;
in response to receiving input while the user equipment is wirelessly connected to the first wireless network over a first wireless communication link, generate a switchover notification indicating a planned temporary switchover of the user equipment to a second wireless network; and
transmit the switchover notification in a communication to the first wireless network, the switchover notification informing the first wireless network of the planned temporary switchover.

* * * * *